US012183293B2

(12) United States Patent
Zhang et al.

(10) Patent No.: US 12,183,293 B2
(45) Date of Patent: Dec. 31, 2024

(54) DISPLAY METHOD AND DISPLAY APPARATUS

(71) Applicant: HISENSE VISUAL TECHNOLOGY CO., LTD., Shandong (CN)

(72) Inventors: Jidong Zhang, Shandong (CN); Jie Dong, Shandong (CN); Wenlong Li, Shandong (CN); Tian Lin, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 18/407,115

(22) Filed: Jan. 8, 2024

(65) Prior Publication Data

US 2024/0153465 A1 May 9, 2024

Related U.S. Application Data

(63) Continuation of application No. PCT/CN2022/096305, filed on May 31, 2022.

(30) Foreign Application Priority Data

Jul. 9, 2021 (CN) ......................... 202110778577.5
Aug. 13, 2021 (CN) ......................... 202110931290.1

(51) Int. Cl.
*G09G 3/34* (2006.01)

(52) U.S. Cl.
CPC ... *G09G 3/3406* (2013.01); *G09G 2320/0626* (2013.01); *G09G 2320/08* (2013.01); *G09G 2354/00* (2013.01); *G09G 2360/144* (2013.01)

(58) Field of Classification Search
CPC ......... G09G 2360/144; G09G 2354/00; G09G 2320/08; G09G 2320/0626; G09G 3/3406
See application file for complete search history.

(56) References Cited

U.S. PATENT DOCUMENTS 8,884,866 B2 * 11/2014 Chen .................... G09G 3/3406 345/102
2006/0256067 A1 11/2006 Montero et al.
(Continued)

FOREIGN PATENT DOCUMENTS

CN 102592547 A 7/2012
CN 103616995 A 3/2014
(Continued)

OTHER PUBLICATIONS

International Search Report, mailed Jul. 6, 2022, from PCT/CN2022/096305, 6 pages.

(Continued)

*Primary Examiner* — Abbas I Abdulselam
(74) *Attorney, Agent, or Firm* — Workman Nydegger

(57) ABSTRACT

A display method and a display apparatus. The method includes: firstly, when an automatic backlight adjustment function of a display apparatus is enabled, measuring a target environment brightness of the environment where the display apparatus is located; then, the display apparatus determining, according to correspondences, between different environment brightnesses and backlight brightnesses, a target backlight brightness corresponding to an environment brightness sensed; and finally, the display apparatus adjusting the current backlight brightness according to the target backlight brightness.

14 Claims, 19 Drawing Sheets

(56) References Cited

U.S. PATENT DOCUMENTS

| | | | | |
|---|---|---|---|---|
| 2012/0274809 | A1 | 11/2012 | Yang et al. | |
| 2013/0162611 | A1 | 6/2013 | Lim et al. | |
| 2017/0025074 | A1 * | 1/2017 | Farrell | G09G 3/36 |

FOREIGN PATENT DOCUMENTS

| | | | |
|---|---|---|---|
| CN | 104123109 | A | 10/2014 |
| CN | 104424914 | A | 3/2015 |
| CN | 104599658 | A | 5/2015 |
| CN | 104618588 | A | 5/2015 |
| CN | 104966485 | A | 10/2015 |
| CN | 105118446 | A | 12/2015 |
| CN | 105390088 | A | 3/2016 |
| CN | 107087079 | A | 8/2017 |
| CN | 107132973 | A | 9/2017 |
| CN | 107665697 | A | 2/2018 |
| CN | 108281103 | A | 7/2018 |
| CN | 109036296 | A | 12/2018 |
| CN | 110047443 | A | 7/2019 |
| CN | 111210777 | A | 5/2020 |
| CN | 111857484 | A | 10/2020 |
| CN | 113421532 | A | 9/2021 |
| CN | 113593488 | A | 11/2021 |
| EP | 2037677 | A1 | 3/2009 |
| JP | 2006091222 | A | 4/2006 |

OTHER PUBLICATIONS

Chinese First Office Action, mailed Mar. 29, 2022, from Chinese Patent Application No. 202110778577.5, 15 pages.

Chinese Second Office Action, mailed Sep. 8, 2022, from Chinese Patent Application No. 202110778577.5, 15 pages.

Chinese First Office Action, mailed Apr. 2, 2022, from Chinese Patent Application No. 202110931290.1, 16 pages.

Chinese Second Office Action, mailed Oct. 17, 2022, from Chinese Patent Application No. 202110931290.1, 13 pages.

Chinese Third Office Action, mailed Jan. 31, 2023, from Chinese Patent Application No. 202110931290.1, 16 pages.

* cited by examiner

DISPLAY METHOD AND DISPLAY APPARATUS

CROSS-REFERENCE TO RELATED APPLICATIONS

The disclosure is a continuation application of PCT/CN2022/096305, filed on May 31, 2022, which claims priorities to Chinese patent application No. 202110778577.5 filed on Jul. 9, 2021, and No. 202110931290.1 filed on Aug. 13, 2021, the entire contents of which are incorporated herein by reference.

TECHNICAL FIELD

The disclosure relates to the field of display technology, in particular to a display method and display apparatus.

BACKGROUND

With the continuous upgrading of display apparatuses, many new functions have emerged in the display aspect of the current display apparatuses, providing a user with more professional display effect. Backlight adjustment can be an intuitive parameter of most parameters that affect the display effect, and functions such as "automatic backlight adjustment" have appeared. When the "automatic backlight adjustment" function of the display apparatus can be turned on, the display apparatus can automatically adjust the current backlight brightness to the target backlight brightness corresponding to the environment brightness according to the sensed environment brightness.

SUMMARY

The disclosure provides a display apparatus, including: a display, configured to present an image from a broadcast system or a network and/or a user interface; and at least one processor in connection with the display and configured to execute instructions to cause the display apparatus to: detect whether an automatic backlight adjustment function on a backlight adjustment page of the display apparatus is turned on; wherein the backlight adjustment page includes an option for indicating the automatic backlight adjustment function and a backlight brightness control for adjusting a backlight brightness value according to an adjustment command input from a user; based on that the automatic backlight adjustment function is turned on, control the display apparatus to automatically sense brightness of environment light, and present a brightness offset control on the backlight adjustment page; wherein the brightness offset control is configured to adjust a brightness offset value according to a command input from the user; detect whether a first adjustment command for adjusting the backlight brightness control from the user on the backlight adjustment page is received; based on that no first adjustment command is received, control the brightness offset control to present a target offset value in response to a second adjustment command for adjusting the brightness offset control from the user on the backlight adjustment page; and determine a target backlight brightness of the display apparatus that needs to be adjusted to according to the target offset value and the brightness of environment light sensed by the display apparatus.

The disclosure further provides a display method for a display apparatus, including: detecting whether an automatic backlight adjustment function on a backlight adjustment page of the display apparatus is turned on; wherein the backlight adjustment page includes an option for indicating the automatic backlight adjustment function and a backlight brightness control for adjusting a backlight brightness value according to an adjustment command input from a user; based on that the automatic backlight adjustment function is turned on, controlling the display apparatus to automatically sense brightness of environment light, and present a brightness offset control on the backlight adjustment page; wherein the brightness offset control is configured to adjust a brightness offset value according to a command input from the user; detecting whether a first adjustment command for adjusting the backlight brightness control from the user on the backlight adjustment page is received; based on that no first adjustment command is received, controlling the brightness offset control to present a target offset value in response to a second adjustment command for adjusting the brightness offset control from the user on the backlight adjustment page; and determining a target backlight brightness of the display apparatus that needs to be adjusted to according to the target offset value and the brightness of environment light sensed by the display apparatus.

DETAILED DESCRIPTION

In order to make purposes and embodiments of the disclosure clearer, the illustrative embodiments of the present disclosure will be clearly and completely described below in combination with accompanying drawings in the embodiments of the present disclosure. Obviously, the illustrative embodiments described herein are only some rather than all of the embodiments in the present disclosure.

It should be noted that brief descriptions of terms in the present disclosure are only for the convenience of understanding embodiments described below, not intended to limit the embodiments of the present disclosure. Unless otherwise noted, these terms shall be understood according to ordinary and plain meanings.

Figure 1:
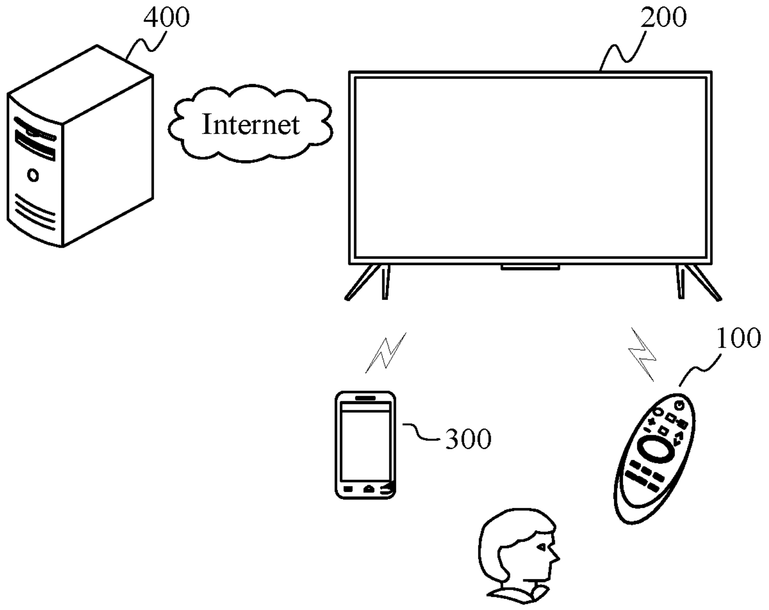
FIG. 1 is a schematic diagram of a usage scenario of a display apparatus according to some embodiments.

FIG. 1 is a schematic diagram of a usage scenario of a display apparatus according to some embodiments. As shown in FIG. 1, the display apparatus 200 can further perform data communication with a server 400, and a user can operate the display apparatus 200 through a smart device 300 or a control device 100.

In some embodiments, the control device 100 may be a remote control. The communication between the remote control and the display apparatus can include at least one of an infrared protocol communication, a Bluetooth protocol communication and other short-distance communication modes; and the remote control can control the display apparatus 200 in a wireless or wired mode. The user may input a user command through at least one ways, such as keys on the remote control, voice input, control panel input or the like, to control the display apparatus 200.

In some embodiments, the smart device 300 may include any one of a mobile terminal, a tablet computer, a computer, a laptop, augmented reality (AR)/virtual reality (VR) devices or the like.

In some embodiments, the display apparatus 200 may be controlled by using the smart device 300. For example, the display apparatus 200 can be controlled by using an application which runs on the smart device.

In some embodiments, the smart device 300 may also be used to communicate data with the display apparatus.

In some embodiments, the display apparatus 200 may further be controlled in other modes besides the control device 100 and the smart device 300. For example, the display apparatus 200 may be controlled by directly receiving a voice command from the user through a module used for obtaining voice command and configured in the display apparatus, or the display apparatus 200 may be controlled by receiving a voice command from the user through a voice control device outside the display apparatus.

In some embodiments, the display apparatus 200 can further perform data communication with a server 400. The display apparatus 200 may perform communication connection through a local area network (LAN), a wireless local area network (WLAN) or other networks. The server 400 may provide various contents and interactions for the display apparatus 200. The server 400 may be a cluster, or a plurality of clusters, and may include servers of the same type or different types.

Figure 2:
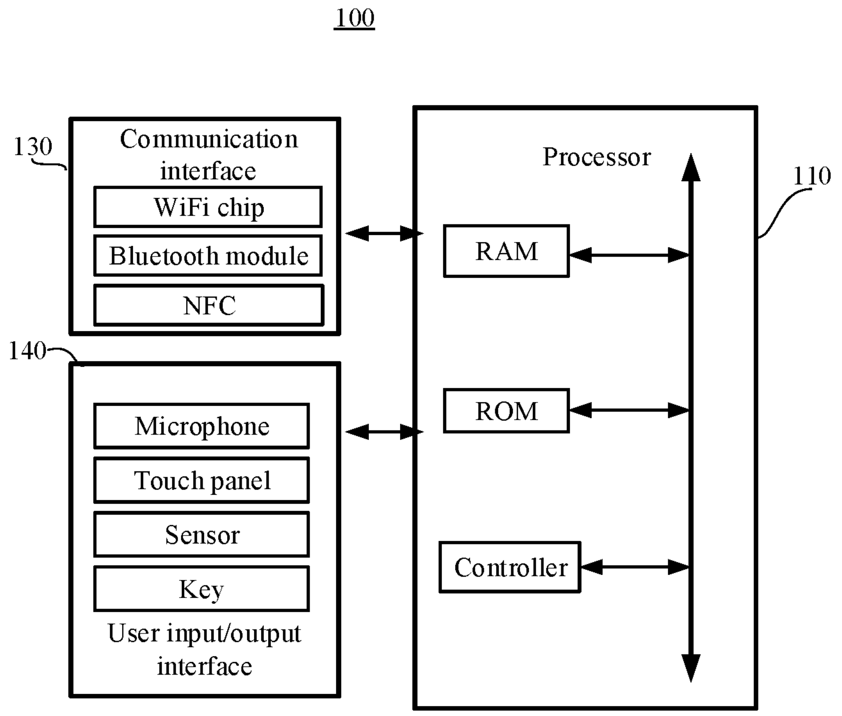
FIG. 2 is a block diagram of a hardware configuration of a control device 100 according to some embodiments.

FIG. 2 is a block diagram of a hardware configuration of a control device 100 according to some embodiments. As shown in FIG. 2, the control device 100 can include a processor 110, a communication interface 130, a user input/output interface 140, a memory and a power source. The control device 100 may receive an operation command input from a user, converts the operation command to an instruction which can be recognized and responded by the display apparatus 200, and acts as an interactive intermediary between the user and the display apparatus 200.

In some embodiments, the communication interface 130 can be used for communicating with the outside and can include at least one of a WIFI chip, a Bluetooth module, or a near field communication (NFC) or an alternative module.

In some embodiments, the user input/output interface 140 can include at least one of a microphone, a touch panel, a sensor, keys, or an alternative module.

Figure 3:
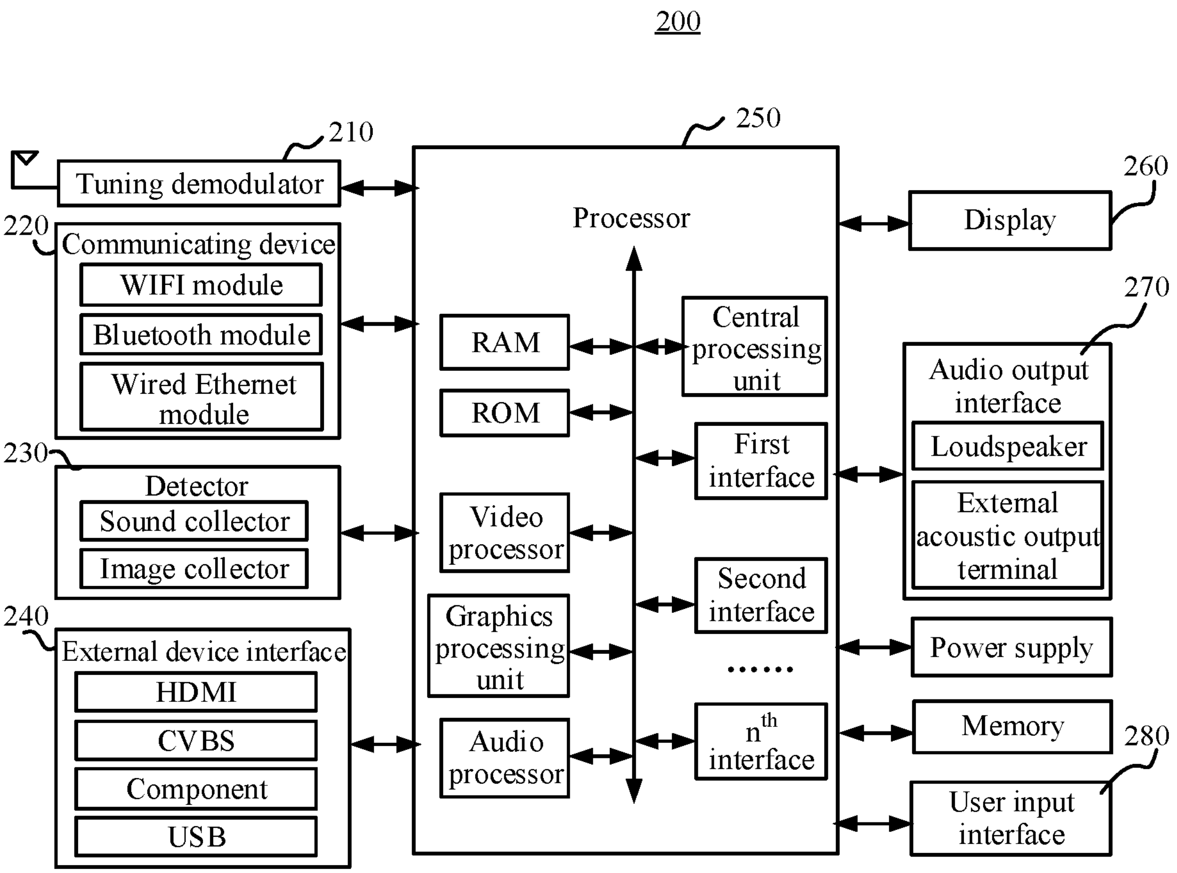
FIG. 3 is a block diagram of a hardware configuration of a display apparatus 200 according to some embodiments.

FIG. 3 is a block diagram of a hardware configuration of a display apparatus 200 according to some embodiments.

In some embodiments, the display apparatus 200 can include at least one of a tuning demodulator 210, a communicating device 220, a detector 230, an external device interface 240, a processor 250, a display 260, an audio output interface 270, a memory, a power source or a user input interface.

In some embodiments the processor can include a central processing unit (CPU), a video processor, an audio processor, a graphics processing unit (GPU), an random access memory (RAM), an read-only memory (ROM), and a first interface to an $n^{th}$ interface used for inputting/outputting.

In some embodiments, the display 260 can include a display panel component configured to display an image, a driving component configured to drive image displaying, a component configured to receive an image signal output from the at least one processor to present a video content, an image content and a menu operation interface, and the user interface (UI) for user operation, etc.

In some embodiments, the display 260 may be at least one of a liquid crystal display, an organic light-emitting diode (OLED) display, or a projection display, or may also be a projection device and a projection screen.

In some embodiments, the modem 210 can receive broadcast television signal via a wired or wireless receiving mode and demodulates audio and video signals, e.g., electrical program guide (EPG) data signals, from a plurality of wireless or wired broadcast television signals.

In some embodiments, the communicating device 220 can be a component for communicating with an external device or a server according to various communication protocols. For example, the communicating device may include at least one of a Wifi module, a Bluetooth module, a wired Ethernet module or other network communication chip or near-field communication chip, or an infrared receiver. The display apparatus 200 may establish the transmission and reception of control signals and data signals with the control device 100 or the server 400 via the communicating device 220.

In some embodiments, the detector 230 can include an optical receiver, an image collector, and a sound collector.

In some embodiments, the external device interface 240 may include but not limited to: any one or more of a high-definition multimedia interface (HDMI), an analog or data high-definition component input interface (component), a composite video broadcast signal (CVBS), a universal serial bus (USB) input interface, or an RGB port, etc. It may also be a composite input/output interface formed by the plurality of above interfaces.

In some embodiments, the at least one processor 250 and the modem 210 may be located in individual devices, that is, the modem 210 may also be located in an external device, e.g. an external set-top-box, etc., of a main device where the at least one processor 250 is located.

In some embodiments, the at least one processor 250 can control work of the display apparatus and can respond to an operation from the user through various software programs stored in the memory. The at least one processor 250 can control overall operation of the display apparatus 200. For example, in response to a user command for selecting an object presented on a user interface on the display 260, the at least one processor 250 may execute an operation related to the object selected by the user command.

In some embodiments, the user input interface 280 can be an interface (e.g, a physical key or others on a body of the display apparatus) used for receiving control input.

Figure 4:
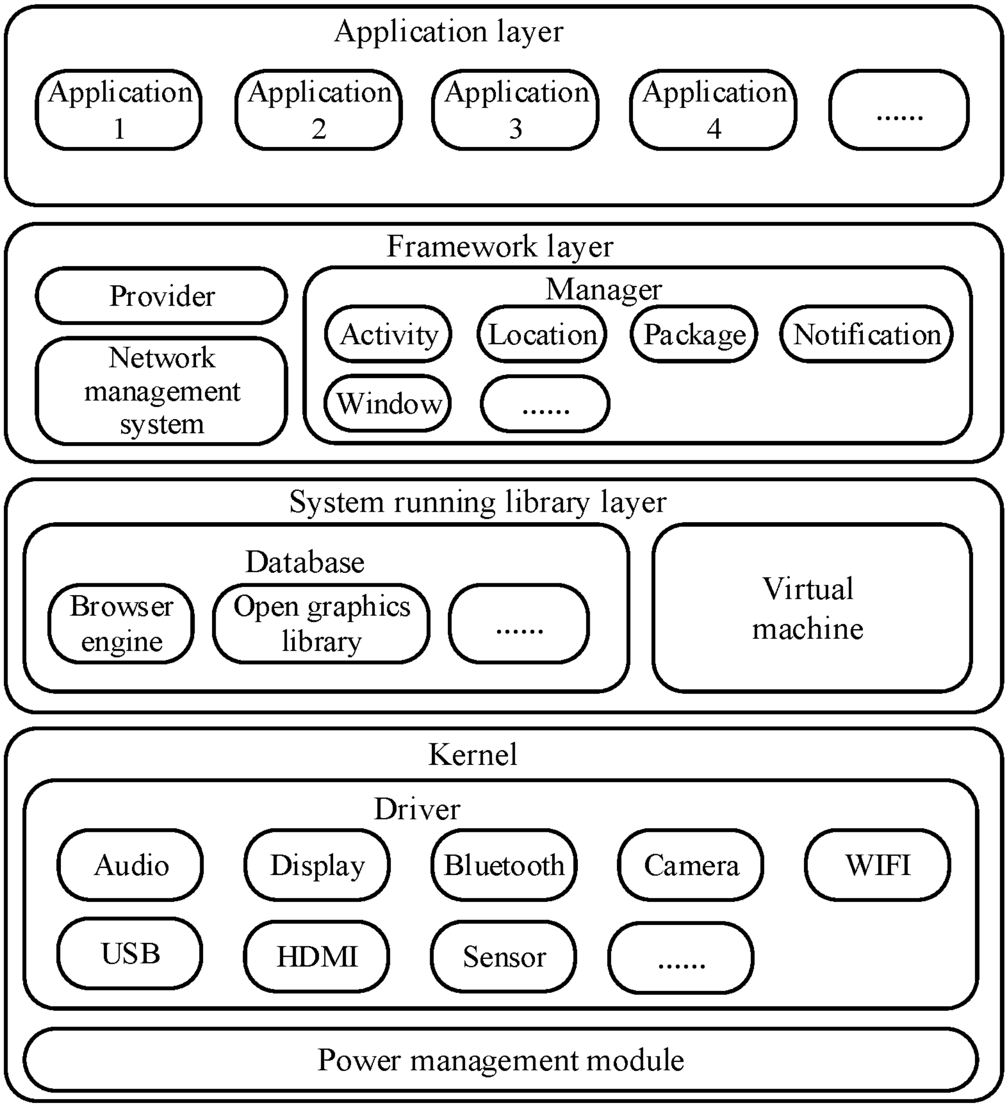
FIG. 4 is a diagram of a software configuration in a display apparatus 200 according to some embodiments.

Referring to FIG. 4, in some embodiments, the system can be divided into four layers, which are an application layer, an application framework layer ("framework layer" for short), an Android runtime and system library layer ("system run library layer" for short), and a kernel layer from top to bottom.

With the continuous upgrading of the display apparatus 200, many new functions have emerged in the display aspect of the current display apparatus 200, providing the user with more professional display effect. Backlight adjustment can be an intuitive parameter of most intuitive parameters that affect the display effect, and functions such as "automatic backlight adjustment" have appeared at present. When the "automatic backlight adjustment" function of the display apparatus 200 is turned on, the display apparatus 200 can automatically adjust the current backlight brightness to the target backlight brightness corresponding to the environment brightness according to the environment brightness sensed.

However, the "automatic backlight adjustment" function provides a user with brightness parameters that have been configured by a technician. The user cannot autonomously and dynamically adjust the backlight brightness or the image brightness according to his/her own brightness preferences and according to the environment brightness, which will make it difficult for the display apparatus 200 to meet the needs of the users, and eventually affect the user experience.

Based on the above, the embodiments of the present disclosure provides a display apparatus 200; and the display apparatus 200 can communicate with the control device 100, such as a remote control or a virtual remote control, etc., and then receive a command from a user by operating the control device 100.

The display apparatus 200 can provide the user with an adjustable correspondence between the environment brightness and the backlight brightness. After the user has set the brightness correspondence, the display apparatus 200 can automatically detect the environment brightness, which may be specifically referred to as the target environment brightness, of the environment where the display apparatus 200 is currently located in a case that the automatic backlight adjustment function is turned on. Then, the display apparatus 200 finds out the target environment brightness in the brightness correspondence set by the user, and then determines the target backlight brightness corresponding to the target environment brightness. The target backlight brightness can be the user's preset backlight brightness that the user wants the display apparatus 200 to present under the target environment brightness. Finally, the display apparatus 200 adjusts the current backlight brightness according to the determined target backlight brightness, so that the adjusted backlight brightness meets the needs of the user.

Figure 5:
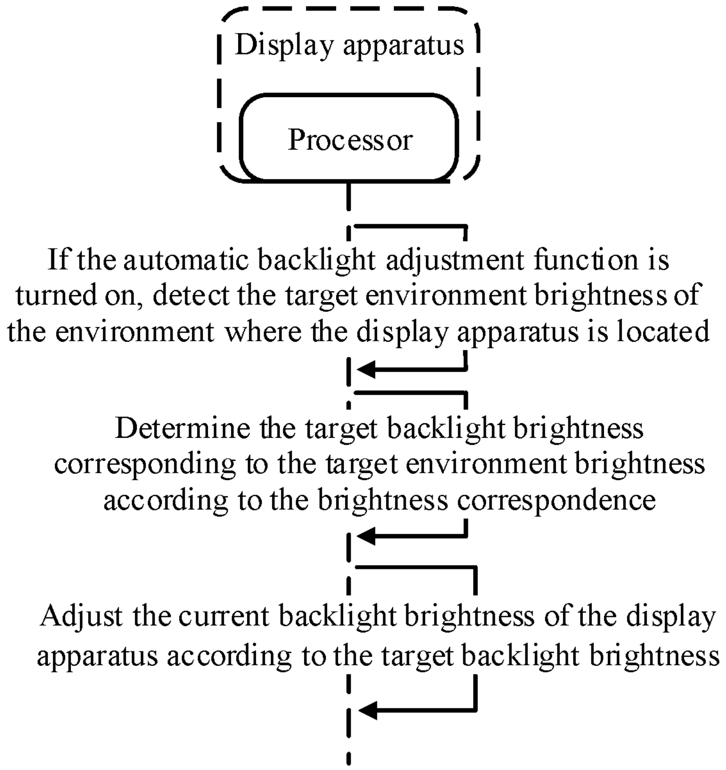
FIG. 5 is a schematic diagram of adjusting backlight brightness in a display apparatus 200 according to some embodiments.

FIG. 5 is a schematic diagram of adjusting the backlight brightness in the display apparatus 200 according to some embodiments. As shown in FIG. 5, the at least one processor 250 of the display apparatus 200 can respond to various commands and executes corresponding control operations at the same time. The at least one processor 250 of the display apparatus 200 may be configured to: firstly, in a case that the automatic backlight adjustment function is turned on, detect the target environment brightness of the environment where the display apparatus 200 is located; then, determine the target backlight brightness corresponding to the target environment brightness according to the brightness correspondence; and finally, adjust the current backlight brightness of the display apparatus 200 according to the target backlight brightness.

In some embodiments, the display apparatus 200 may also provide the user with a brightness detail setting page that can adjust the brightness correspondence. The brightness detail setting page shows the correspondence, e.g., a folded line relationship, a curve relationship, etc., between the environment brightness and the backlight brightness. Usually, the brightness correspondence can be established in a two-dimensional coordinate system. The abscissa represents the environment brightness, and the ordinate represents the backlight brightness. The backlight brightness corresponding to each environment brightness can present different brightness values correspondingly according to user's selection.

Figure 6:
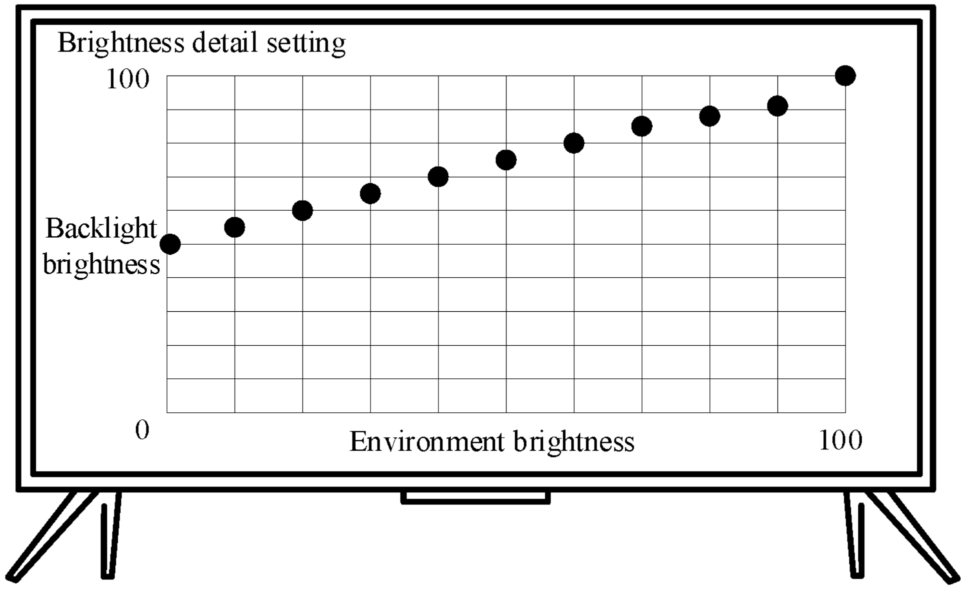
FIG. 6 is a schematic diagram of a brightness detail setting page according to some embodiments.

FIG. 6 is a schematic diagram of a brightness detail setting page according to some embodiments. As shown in FIG. 6, on the brightness detail setting page, each cell on the horizontal and longitudinal axes represents 10 values, the abscissa from left to right represents that the environment brightness is from dark to bright, and the ordinate from bottom to top represents that the backlight brightness is from dark to bright. In addition, in the correspondence, the environment brightness value on the abscissa is the representation value after the real environment brightness is mapped, and the backlight brightness value on the ordinate is also the representation value after the real backlight brightness is mapped. On the longitudinal line corresponding to each environment brightness, a movable positioning control can be provided, and the positioning control on each longitudinal line can only be moved longitudinally up and down. The user can control the positioning control to move longitudinally, and then adjust the backlight brightness corresponding to certain environment brightness.

In the process of setting the brightness correspondence, the user may first input a first command for presenting a page to the display apparatus 200, to control the display apparatus 200 to present a brightness detail setting page. Then, the operation of the user moving the positioning control on a longitudinal line corresponding to the target environment brightness on the brightness detail setting page can be regarded as inputting a first setting command to the display apparatus 200, to control the display apparatus 200 to set the target backlight brightness corresponding to the target environment brightness as the backlight brightness at the position where the positioning control is located.

Figure 7:
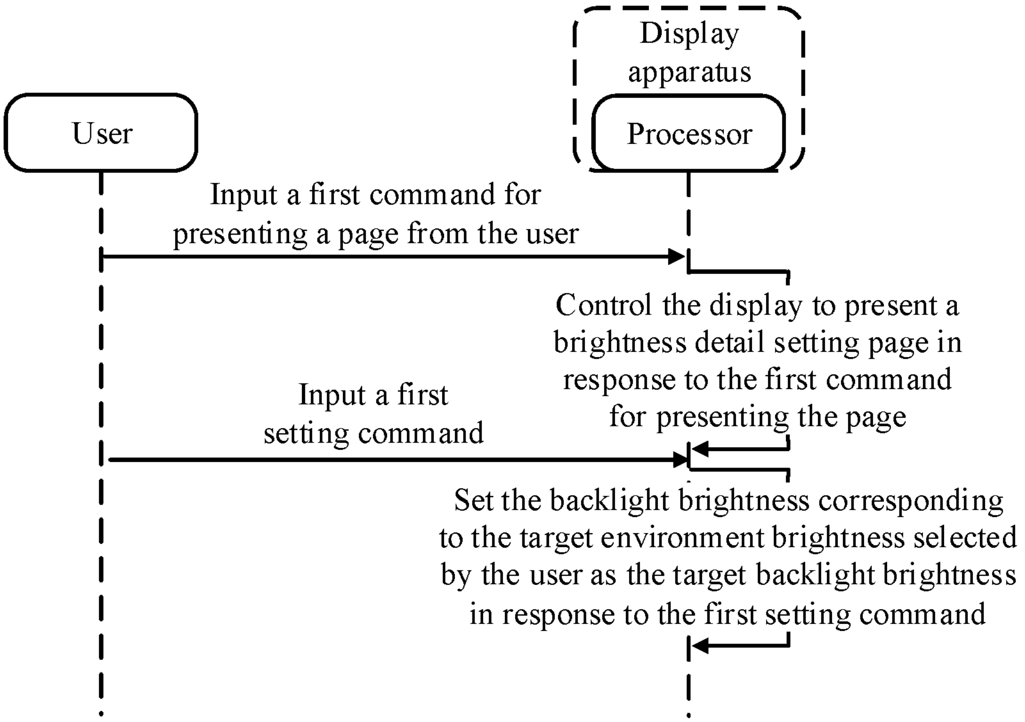
FIG. 7 is a schematic diagram of setting a brightness correspondence in a display apparatus 200 according to some embodiments.

FIG. 7 is a schematic diagram of setting the brightness correspondence in the display apparatus 200 according to some embodiments. As shown in FIG. 7, in the process of setting the brightness correspondence, the at least one processor 250 of the display apparatus 200 can be configured to: firstly, in response to a first command for presenting a page from the user, control the display 260 to present a brightness detail setting page; and then, in response to a first setting command from the user on the brightness detail setting page, set the backlight brightness corresponding to the target environment brightness selected by the user as the target backlight brightness.

As mentioned above, the display apparatus 200 can automatically detect the environment brightness only when the automatic backlight adjustment function is turned on. In other words, if the automatic backlight adjustment function is not turned on, then even if the user presets the brightness correspondence, the display apparatus 200 cannot automatically adjust the backlight brightness according to the brightness correspondence. Therefore, before the display apparatus 200 automatically adjusts the backlight brightness, the user needs to control the display apparatus 200 to turn on the automatic backlight adjustment function.

In some embodiments, the switch to turn on the automatic backlight adjustment function can be set on the brightness detection page of the display apparatus 200; and the display apparatus 200 needs to present an image setting page of the previous level before presenting the brightness detection page. A brightness detection option can be provided on the image setting page, and the user can control the display apparatus 200 to present the brightness detection page by selecting the brightness detection option on the image setting page.

Figure 8:
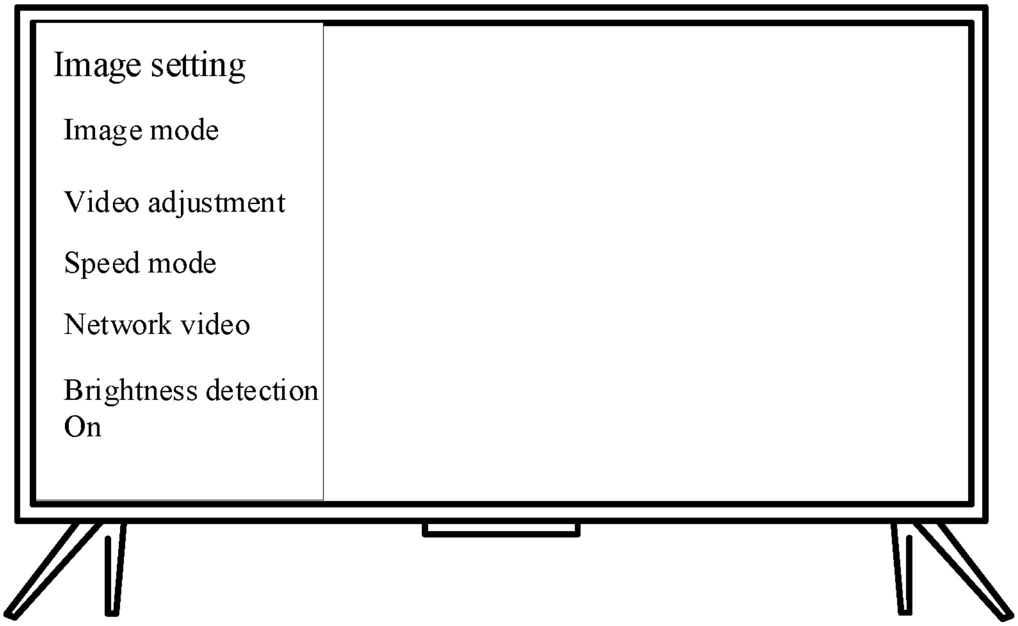
FIG. 8 is a schematic diagram of an image setting page including a brightness detection option according to some embodiments.

FIG. 8 is a schematic diagram of an image setting page including a brightness detection option according to some embodiments. As shown in FIG. 8, options such as the image mode, video adjustment, speed mode, network video, and brightness detection are presented on the image setting page.

Figure 9:
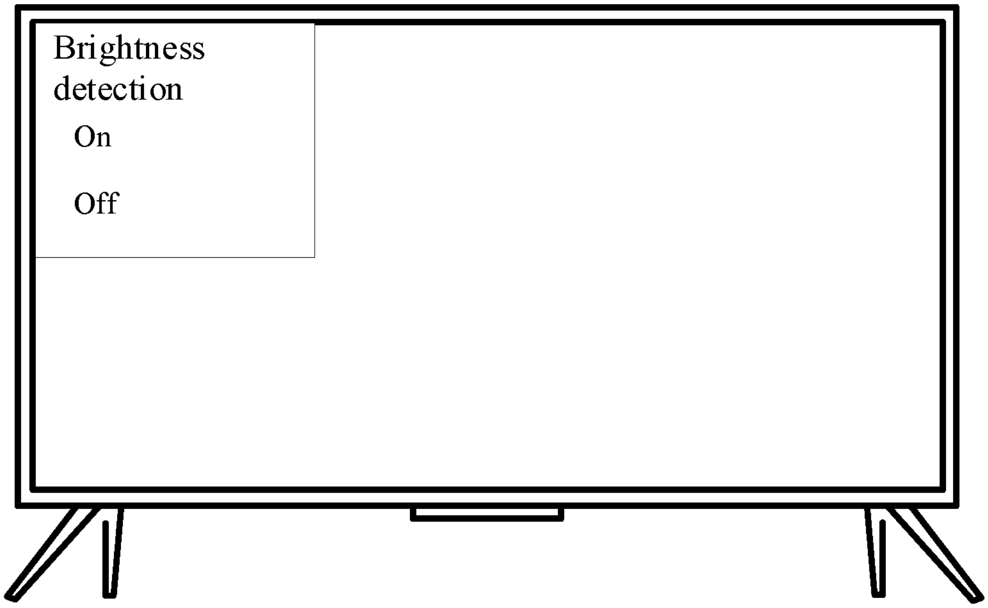
FIG. 9 is a schematic diagram of a brightness detection page according to some embodiments.

FIG. 9 is a schematic diagram of a brightness detection page according to some embodiments. As shown in FIG. 9, an on option and an off option are presented on the brightness detection page. If the user selects the on option on the brightness detection page, the display apparatus 200 immediately turns on the automatic backlight adjustment function and starts to detect the environment brightness at the same time. If the user selects the off option on the brightness detection page, the display apparatus 200 turns off the automatic backlight adjustment function, and will not automatically adjust the backlight brightness according to the environment brightness. On the image setting page as shown in FIG. 8, whether the current automatic backlight adjustment function is on or off can be also shown at the position of the brightness detection option, so that the user can clearly understand the situation of this function.

In the process of turning on or turning off the automatic backlight adjustment function, the user can first input a second command to the display apparatus 200 to control the display apparatus 200 to present the image setting page; then, the user selects the brightness detection option on the image setting page, to input a first selection command to the display apparatus 200 to control the display apparatus 200 to present the brightness detection page; and finally, the user selects the on option for brightness detection on the brightness detection page, to input a second selection command to the display apparatus 200 to control the display apparatus 200 to turn on the automatic backlight adjustment function. Alternatively, the user selects the off option for brightness detection on the brightness detection page, to input a third selection command to the display apparatus 200 to control the display apparatus 200 to turn off the automatic backlight adjustment function.

Figure 10:
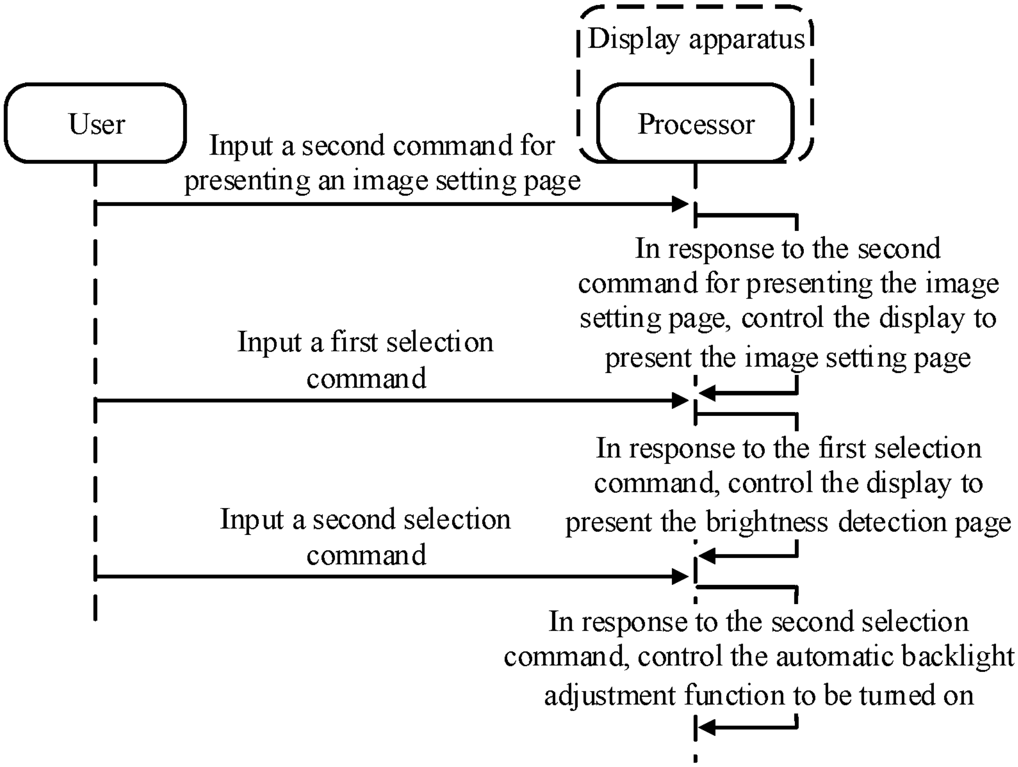
FIG. 10 is a schematic diagram of controlling an automatic backlight adjustment function in a display apparatus 200 according to some embodiments.

FIG. 10 is a schematic diagram of controlling the automatic backlight adjustment function in a display apparatus 200 according to some embodiments. As shown in FIG. 10, in the process of turning on or turning off the automatic backlight adjustment function, the at least one processor 250 of the display apparatus 200 may be configured to: firstly, in response to a second command for presenting an image setting page from the user, control the display 260 to present the image setting page; then, in response to a first selection command for selecting the brightness detection option on the image setting page, control the display 260 to present the brightness detection page; and finally, in response to the second selection command for selecting the on option for brightness detection on the brightness detection page, control the automatic backlight adjustment function to be turned on.

Figure 11:
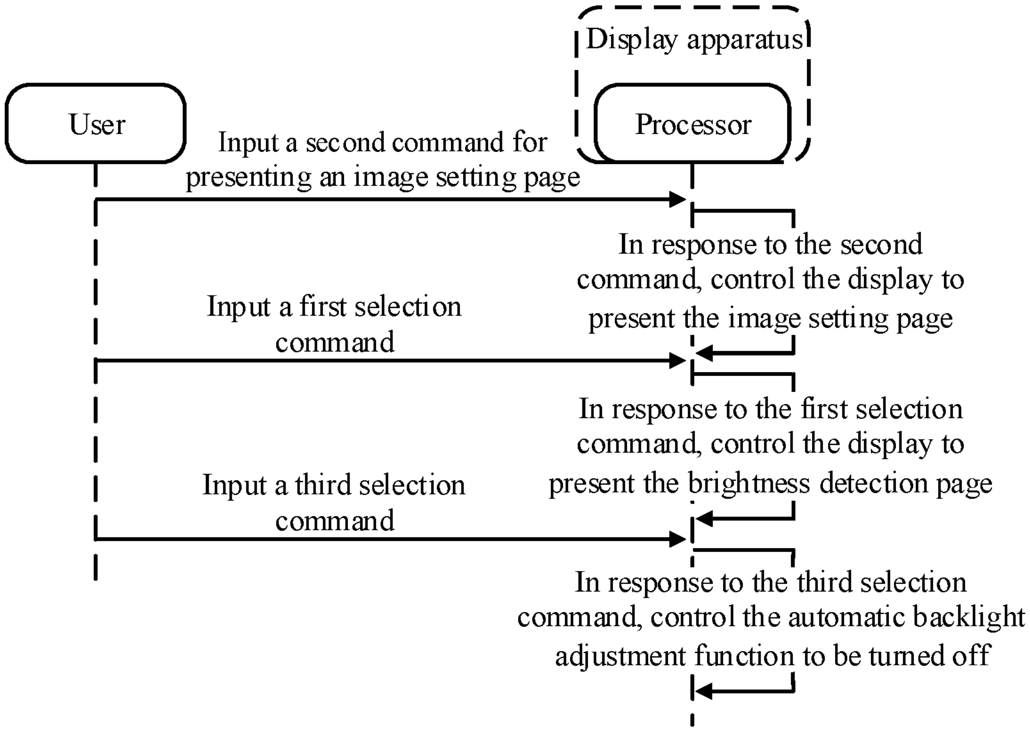
FIG. 11 is another schematic diagram of controlling an automatic backlight adjustment function in a display apparatus 200 according to some embodiments.

FIG. 11 is another schematic diagram of controlling the automatic backlight adjustment function in the display apparatus 200 according to some embodiments. As shown in FIG. 11, in the process of turning on or turning off the automatic backlight adjustment function, the at least one processor 250 of the display apparatus 200 may be configured to: in response to a third selection command for selecting the off option for brightness detection on the brightness detection page, control the automatic backlight adjustment function to be turned off.

In some embodiments, in order to facilitate the user to find the brightness detail setting page, in a case that the automatic backlight adjustment function is turned on, the brightness detail setting option can also be directly presented on the aforementioned image setting page, and the user can control the display apparatus 200 to directly present the brightness detail setting page by selecting the brightness detail setting option.

Figure 12:
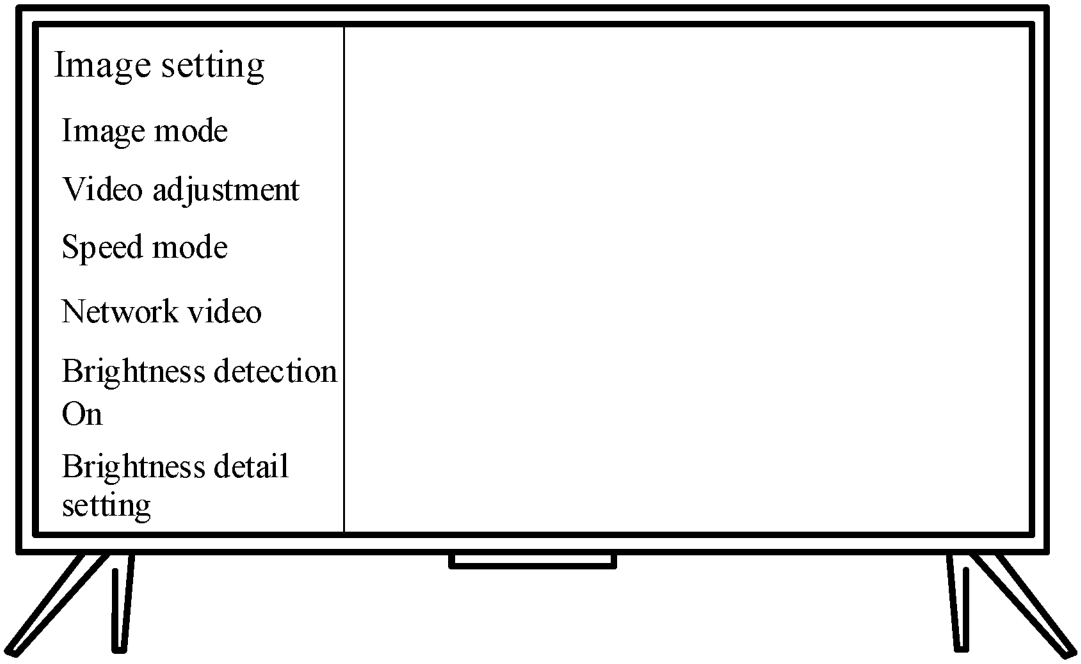
FIG. 12 is a schematic diagram of an image setting page including a brightness detail setting option according to some embodiments.

FIG. 12 is a schematic diagram of an image setting page including a brightness detail setting option according to some embodiments. As shown in FIG. 12, in addition to options such as the image mode, video adjustment, speed mode, network video, and brightness detection, etc., on the image setting page, in a case that the automatic backlight adjustment function is turned on, the brightness detail setting option are also presented on the image setting page.

It is worth noted that the user's operation of selecting the brightness detail setting option on the image setting page can also be regarded as inputting a first command for presenting the image setting page to the display apparatus 200. In this process, the at least one processor 250 of the display apparatus 200 may be configured to: firstly, control the image setting page to present the brightness detail setting option in a case that the automatic backlight adjustment function is turned on; and then, in response to a first command for selecting a brightness detail setting option on the image setting page, control the display 260 to present the brightness detail setting page.

In some embodiments, when the automatic backlight adjustment function is turned off, the display apparatus 200 cannot automatically adjust the backlight brightness according to the environment brightness. In this case, the user can manually adjust the backlight brightness. Therefore, in a case that the automatic backlight adjustment function is turned off, the display apparatus 200 can also provide the user with a backlight brightness page in which the backlight brightness can be manually adjusted. A brightness bar can be presented on the backlight brightness page, and a positioning control that can be positioned to a specific brightness value can be provided on the brightness bar. The user can move the positioning control according to his/her own needs, to adjust the value of the backlight brightness.

Figure 13:
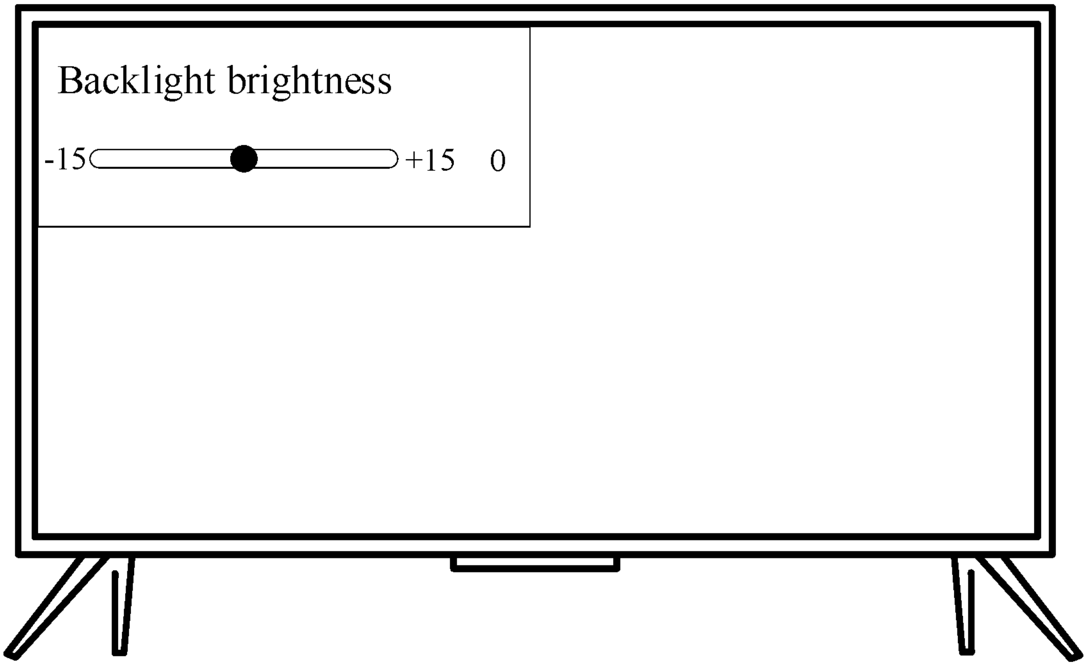
FIG. 13 is a schematic diagram of a backlight brightness page with a brightness bar according to some embodiments.

FIG. 13 is a schematic diagram of a backlight brightness page with a brightness bar according to some embodiments. As shown in FIG. 13, a position in the middle of the brightness bar on the backlight brightness page can correspond to the value 0 of the backlight brightness, and endpoints on the left and right sides of the brightness bar can correspond to extreme values, e.g., −15 and +15, of the backlight brightness respectively. When the user moves the positioning control to move left and right on the brightness bar, the value of the backlight brightness will be determined between −15 and +15. Moreover, the brightness value corresponding to the final stop position of the positioning control will be presented on the rightmost side of the brightness bar, so that the user can see it.

In some embodiments, when the automatic backlight adjustment function is turned off, in order to facilitate the user to quickly find out the backlight brightness page, the display apparatus 200 can also directly present the backlight brightness option on the image setting page, and the user can control the display apparatus 200 to present the backlight brightness page by selecting the backlight brightness option.

Figure 14:
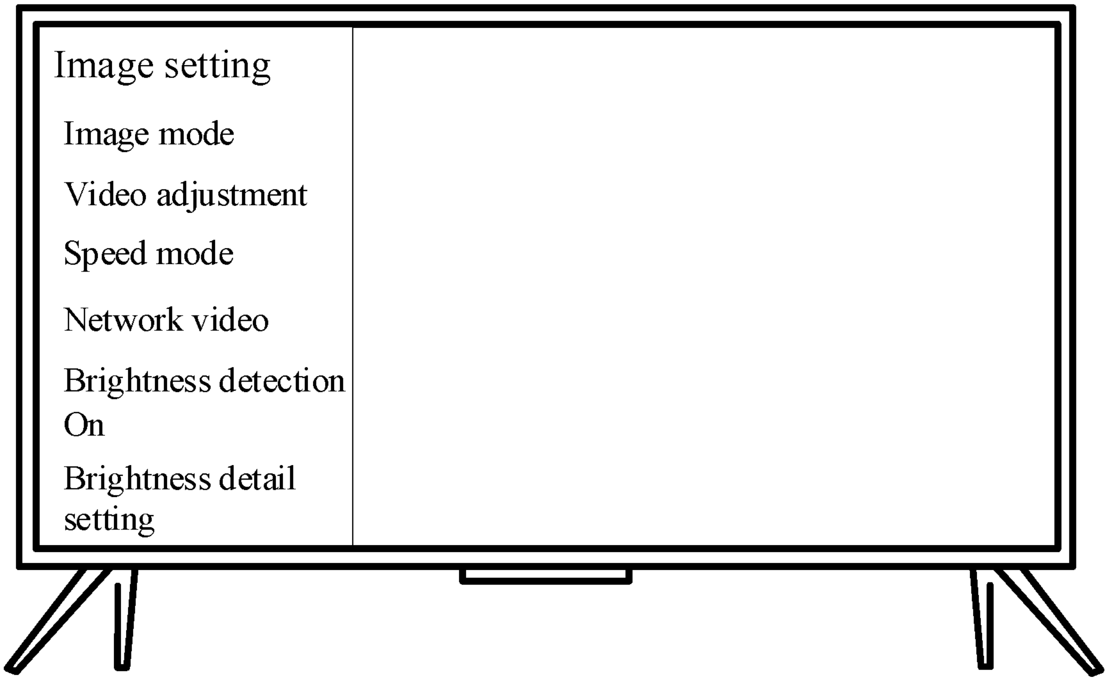
FIG. 14 is a schematic diagram of an image setting page including a backlight brightness option according to some embodiments.

FIG. 14 is a schematic diagram of an image setting page including a backlight brightness option according to some embodiments. As shown in FIG. 14, in addition to options such as the image mode, video adjustment, speed mode, network video, and brightness detection, etc. on the image setting page, in a case that the automatic backlight adjustment function is turned off, the backlight brightness option are also presented on the image setting page.

The operation of the user selecting the backlight brightness option on the image setting page can be regarded as inputting a fourth selection command to the display apparatus 200, to control the display apparatus 200 to present the backlight brightness page. The operation of moving the positioning control on the backlight brightness page can be regarded as inputting a move command to the display apparatus 200, to control the display apparatus 200 to obtain the target backlight brightness corresponding to the position of the positioning control.

Figure 15:
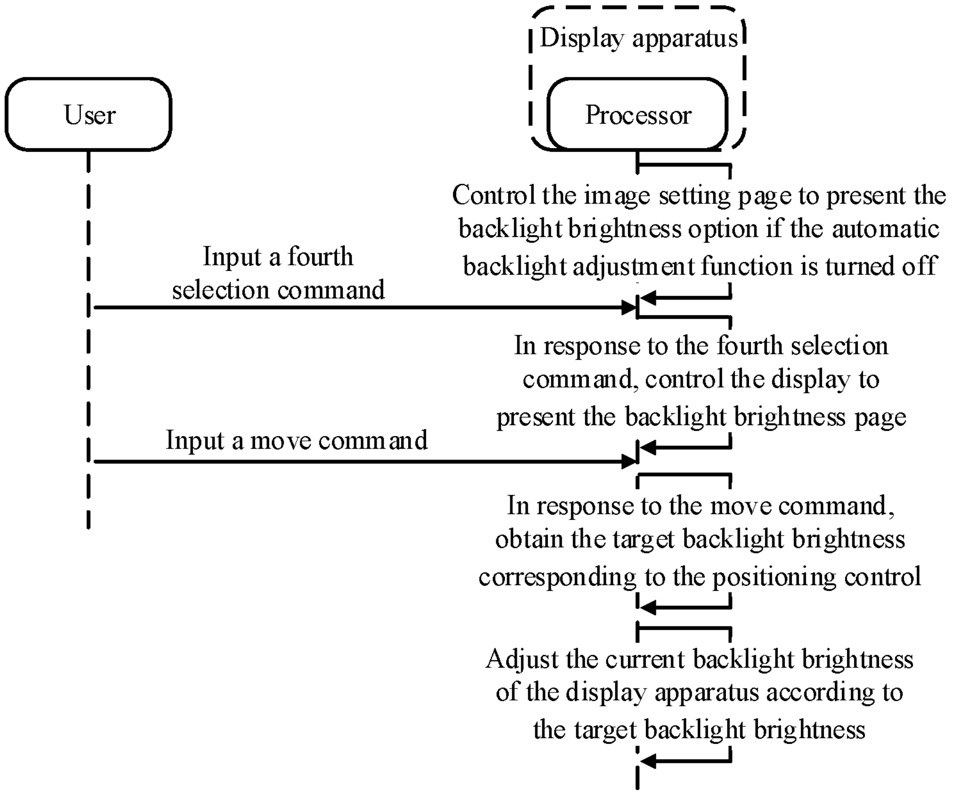
FIG. 15 is another schematic diagram of adjusting backlight brightness in a display apparatus 200 according to some embodiments.

FIG. 15 is another schematic diagram of adjusting the backlight brightness in the display apparatus 200 according to some embodiments. As shown in FIG. 15, in the process that the display apparatus 200 adjusts the current backlight brightness according to the target backlight brightness manually selected by the user, the at least one processor 250 of the display apparatus 200 may be configured to: firstly, control the image setting page to present the backlight brightness option in a case that the automatic backlight adjustment function is turned off; then, in response to a fourth selection command for selecting the backlight brightness option on the image setting page, control the display 260 to present the backlight brightness page; next, in response to a move command for moving the positioning control on the backlight brightness page, obtain the target backlight brightness corresponding to the positioning control; and finally, adjust the current backlight brightness of the display apparatus 200 according to the target backlight brightness.

In some embodiments, an adjustment option and a basic setting option may also be presented on the brightness detail setting page on the display apparatus 200. The selection of the basic setting option can be regarded as inputting a fifth selection command to the display apparatus 200, to control the display apparatus 200 to present the backlight brightness page. In this way, the user can manually adjust the backlight brightness by directly entering the backlight brightness page from the brightness detail setting page.

Figure 16:
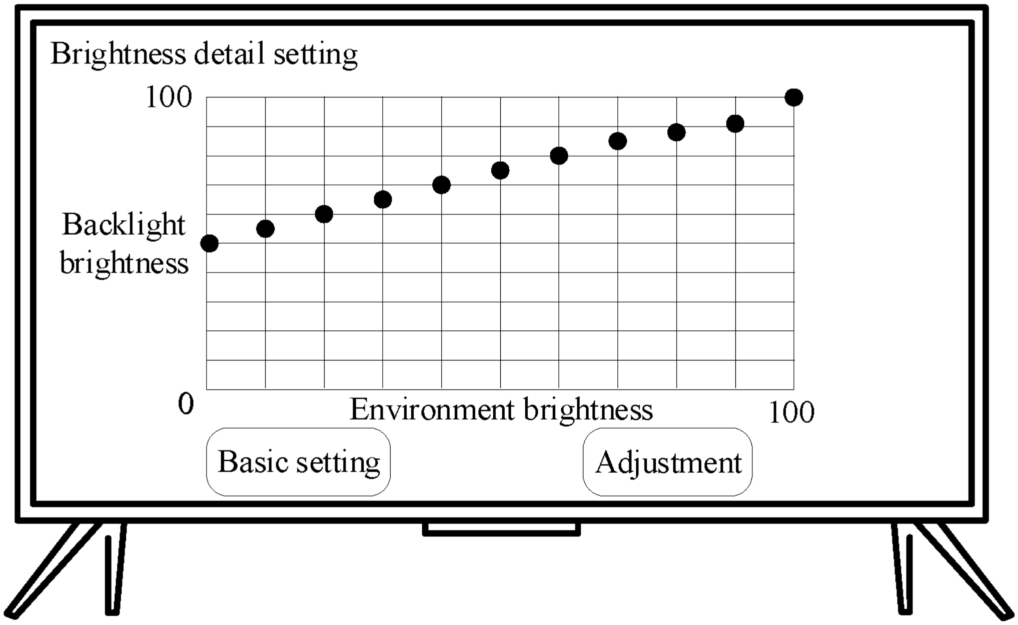
FIG. 16 is another schematic diagram of a brightness detail setting page according to some embodiments.

FIG. 16 is another schematic diagram of a brightness detail setting page according to some embodiments. As shown in FIG. 16, the brightness detail setting page also presents a basic setting option and an adjustment option in addition to presenting a correspondence between the environment brightness and the backlight brightness.

In some embodiments, after the user selects the basic setting page on the brightness detail setting page, the display apparatus 200 can also present the backlight brightness page. In this case, the user can also input a move command for moving the positioning control on the backlight brightness page to the display apparatus 200.

In some embodiments, in order to avoid the change in the brightness correspondence caused by the user's misoperation on the brightness detail setting page, only the brightness correspondence which has been set and is non-adjustable may be presented when the brightness detail setting page is presented. Then, when the user needs to adjust the target backlight brightness corresponding to certain target environment brightness, the user selects the adjustment option on the brightness detail setting page. The selection of the adjustment option on the brightness detail setting page can be regarded as inputting a sixth selection command to the display apparatus 200, to control the brightness correspondence presented on the brightness detail setting page to become a correspondence in which backlight brightness values are adjustable, so that the user can move the positioning control along the longitudinal line of the environment brightness to adjust the backlight brightness corresponding to certain target environment brightness.

Figure 17:
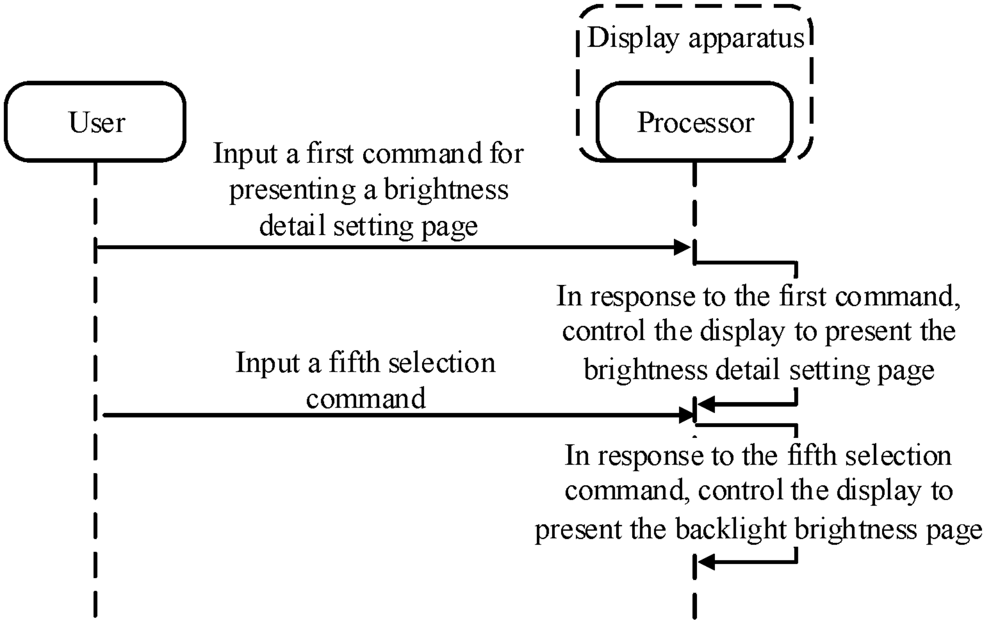
FIG. 17 is a schematic diagram of presenting a backlight brightness page in a display apparatus 200 according to some embodiments.

FIG. 17 is a schematic diagram of presenting a backlight brightness page in a display apparatus 200 according to some embodiments. As shown in FIG. 17, in the process that the display apparatus 200 presents the backlight brightness page, the at least one processor 250 of the display apparatus 200 may be configured to: first, in response to a first command for presenting a brightness detail setting page, control the display 260 to present the brightness detail setting page; and then, in response to a fifth selection command for selecting a basic setting option on the brightness detail setting page, control the display 260 to present the backlight brightness page.

Figure 18:
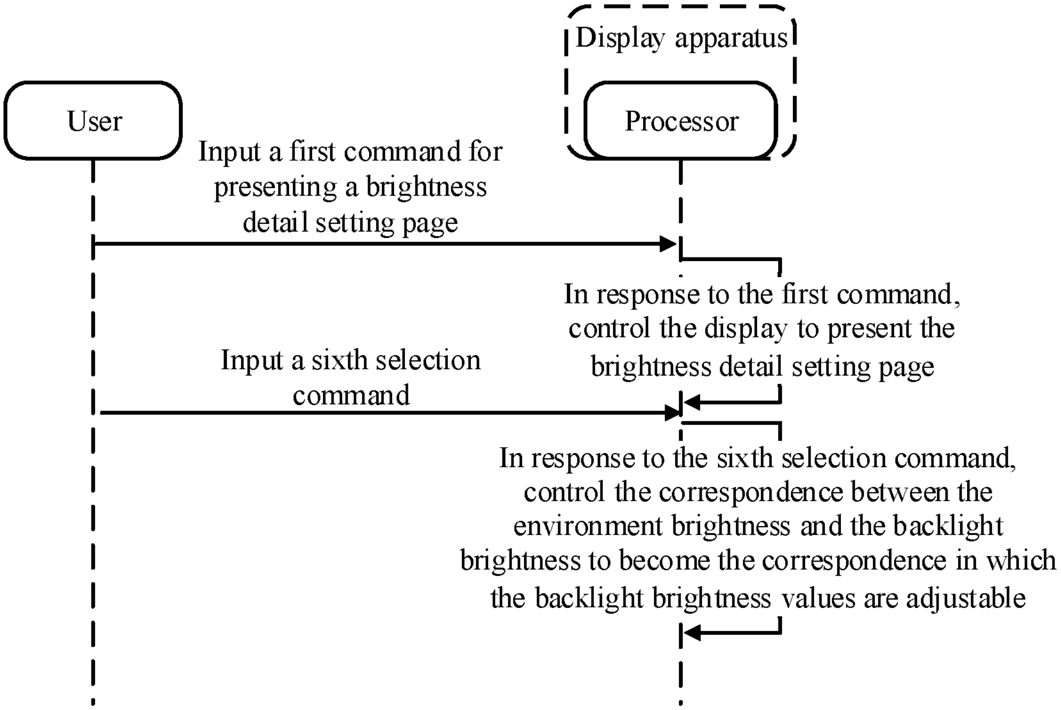
FIG. 18 is another schematic diagram of setting a brightness correspondence in a display apparatus 200 according to some embodiments.

FIG. 18 is another schematic diagram of setting the brightness correspondence in the display apparatus 200 according to some embodiments. As shown in FIG. 18, in the process that the display apparatus 200 sets the brightness correspondence, the at least one processor 250 of the display apparatus 200 may be configured to: in response to a sixth selection command for selecting the adjusting option on the brightness detail setting page, control the correspondence between the environment brightness and the backlight brightness to become a correspondence in which the backlight brightness values are adjustable.

Figure 19:
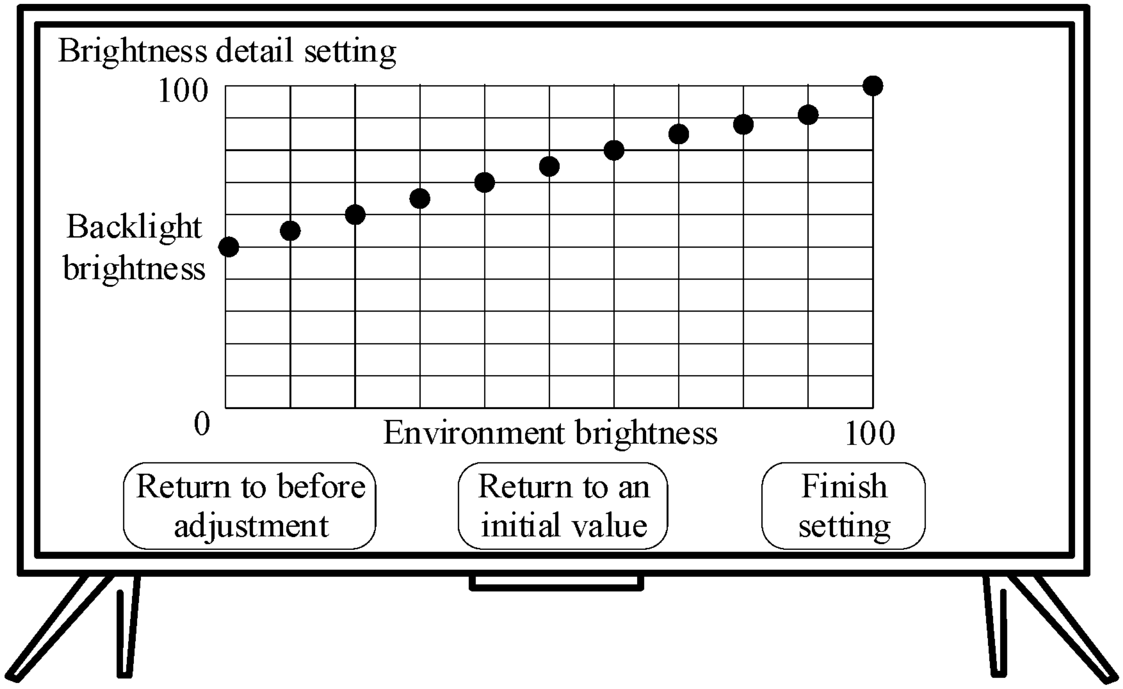
FIG. 19 is a schematic diagram of a brightness detail setting page in a process of adjusting a brightness correspondence according to some embodiments.

In some embodiments, after the user selects the adjustment option on the brightness detail setting page, the brightness correspondence becomes an adjustable relationship. In this case, the brightness detail setting page can also present options, such as "return to before adjustment", "return to an initial value", and "finish setting", etc. Referring to FIG. 19, FIG. 19 is a schematic diagram of a brightness detail setting page in the process of adjusting the brightness correspondence according to some embodiments. In the process of adjusting the target backlight brightness corresponding to the target environment brightness, if the adjustment result is unsatisfactory and the user wants to restore the brightness correspondence before the adjustment, the user can select the "return to previous adjustment" option on the brightness detail setting page, to control the display apparatus 200 to restore to the previous adjustment result, so the brightness correspondence adjusted this time is invalidated or ineffective.

Alternatively, in the process of adjusting the target backlight brightness corresponding to the target environment brightness, if the user wants to restore the initial brightness correspondence, i.e., the initial brightness correspondence set by the display apparatus 200 when it leaves the factory, then the user can select "return to the initial value" option on the brightness detail setting page, to control the display apparatus 200 to restore the initial brightness correspondence, so the brightness correspondence adjusted this time will not take effect.

Alternatively, in the process of adjusting the target backlight brightness corresponding to the target environment brightness, if the user finishes the adjustment and setting for the brightness correspondence, the user can select the "finish setting" option on the brightness detail setting page, to control the display apparatus 200 to present the adjusted brightness correspondence and fix the brightness correspondence, to prevent the user from re-adjusting the target backlight brightness by mistake. After the adjustment is finished, only the basic setting option and the adjustment option are presented on the brightness detail setting page. When the user needs to adjust the backlight brightness corresponding to certain environment brightness again, the user can select the adjustment option on the brightness detail setting page again, so that the brightness correspondence becomes an adjustable correspondence.

It is worth noted that, in the embodiments of the disclosure, the user can input various commands to the display apparatus 200 by operating the keys on the control device 100; alternatively, in the case that the display apparatus 200 has voice services, the user can input a voice command to the display apparatus 200 by inputting voice content directly to the display apparatus 200 or inputting the voice content to the display apparatus 200 via the control device 100. And, when the user selects an option or selects a positioning control on the display apparatus 200, the user may first input a command to control the focus to be positioned on the target option or the target positioning control, and then input a confirmation command for selection.

In the embodiments of the present disclosure, when the automatic backlight adjustment function on the display apparatus 200 is turned on, the target environment brightness of the environment where the display apparatus 200 is located can be detected. Then, the display apparatus 200 can determine the target backlight brightness corresponding to the detected target environment brightness according to the correspondence between different environment brightness and backlight brightness preset by the user. Finally, the display apparatus 200 can adjust the current backlight brightness according to the obtained target backlight brightness. In the embodiments of the present disclosure, the user can set the corresponding backlight brightness for different environment brightness according to his/her own needs, so that the correspondence between the environment brightness and the backlight brightness can be flexibly adjusted, so as to meet the user's needs and ensure the user experience.

In order to solve the problem that the display apparatus 200 cannot flexibly adjust the backlight brightness according to the user's needs, the embodiments of the present disclosure also provide a method for adjusting the backlight, which can be applied to the display apparatus 200 in the foregoing embodiments. The method may specifically include: based on the automatic backlight adjustment function is turned on, detecting a target environment brightness of the environment where the display apparatus 200 is located; determining the target backlight brightness corresponding to the target environment brightness according to the brightness correspondence; and adjusting the current backlight brightness of the display apparatus 200 according to the target backlight brightness.

In some embodiments, the method may further include: in response to a first command for presenting a brightness detail setting page from the user, controlling the display 260 to present the brightness detail setting page; and in response to a first setting command on the brightness detail setting page, setting the backlight brightness corresponding to the target environment brightness selected by the user as the target backlight brightness.

In some embodiments, the method may further include: in response to a second command for presenting an image setting page from the user, controlling the display 260 to present the image setting page; in response to a first selection command for selecting the brightness detection option on the image setting page, controlling the display 260 to present a brightness detection page; and in response to a second selection command for selecting the on option for brightness detection on the brightness detection page, controlling the automatic backlight adjustment function to be turned on.

In some embodiments, the method may further include: based on that the automatic backlight adjustment function is turned on, controlling the image setting page to present the brightness detail setting option; and in response to a first command for selecting the brightness detail setting option on the image setting page, controlling the display 260 to present the brightness detail setting page.

In some embodiments, the method may further include: in response to a first command for presenting a brightness detail setting page from the user, controlling the display 260 to present the brightness detail setting page; and in response to a fifth selection command for selecting the basic setting option on the brightness detail setting page, controlling the display 260 to present the backlight brightness page.

In some embodiments, the method may further include: in response to a sixth selection command for selecting the adjustment option on the brightness detail setting page, controlling the correspondence between the environment brightness and the backlight brightness to become a correspondence in which backlight brightness values are adjustable.

In some embodiments, the method may further include: in response to a third selection command for selecting the off option for brightness detection on the brightness detection page, controlling the automatic backlight adjustment function to be turned off.

In some embodiments, the method may further include: based on that the automatic backlight adjustment function is turned off, controlling an image setting page to present the backlight brightness option; and in response to a fourth selection command for selecting the backlight brightness option on the image setting page, controlling the display 260 to present the backlight brightness page.

In some embodiments, the method may further include: in response to a move command for moving the positioning control on the backlight brightness page, obtaining the target backlight brightness corresponding to the positioning control; and adjusting the current backlight brightness of the display apparatus 200 according to the target backlight brightness.

The backlight adjustment method in the embodiments of the present disclosure can be applied to the display apparatus 200 as described in the foregoing embodiments.

The display apparatus 200 generally has a manual backlight adjustment function and an automatic backlight adjustment function. The manual backlight adjustment function is that the user needs to adjust the value corresponding to the backlight brightness on the display apparatus 200, to control the display apparatus 200 to adjust the backlight brightness; and the automatic backlight adjustment function is that the display apparatus 200 senses the brightness of the environment light through the sensor(s), and then automatically adjusts its own backlight brightness to match the brightness of the environment light.

However, in the present display apparatus 200, the manual backlight adjustment function and the automatic backlight adjustment function are independent. In a case where the automatic backlight adjustment function is turned on, if the user has manually adjusted the backlight brightness, the automatic backlight adjustment function will still automatically sense the environment light and re-adjust the backlight brightness, which may cause failure of the user's manual adjustment operation and also affect the usage experience of the user.

Considering the above problem, the embodiments of the present disclosure provide a display apparatus 200. The display apparatus 200 can not only provide the user with the manual backlight adjustment function and the automatic backlight adjustment function, but also determine whether the automatic backlight adjustment function needs to be turned off based on whether the user uses the manual backlight adjustment function. In this way, the manual backlight adjustment function and the automatic backlight adjustment function do not affect each other to ensure the usage experience of the user.

In the embodiments of the present disclosure, both the manual backlight adjustment function and the automatic backlight adjustment function provided by the display apparatus 200 may be presented on the same backlight adjustment page. Where, the automatic backlight adjustment function can be presented in the form of an option with a switch control, the manual backlight adjustment function can be presented in the form of a backlight brightness control, and the currently selected value of the backlight brightness can be also presented on the backlight brightness control.

Figure 20:
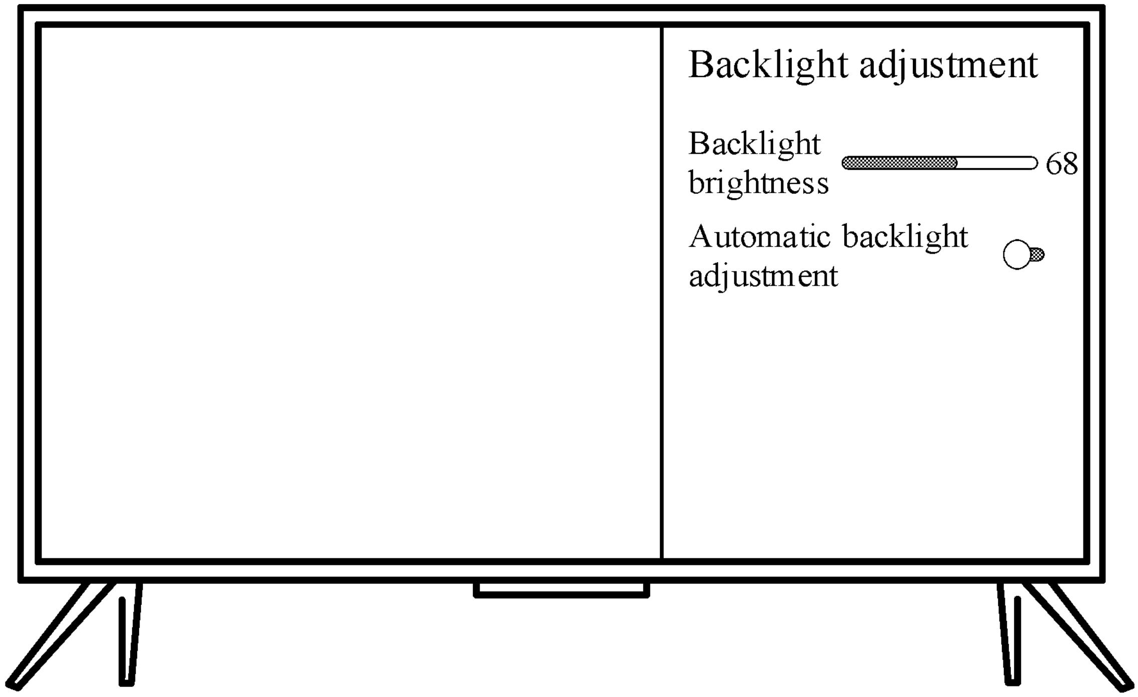
FIG. 20 is a schematic diagram of a backlight adjustment page according to some embodiments.

Referring to FIG. 20, FIG. 20 is a schematic diagram of a backlight adjustment page according to some embodiments. On the backlight adjustment page, a switch control can be selected and controlled by the user to turn on or off the automatic backlight adjustment function. For example, the user can control the display apparatus 200 through a control device 100 such as a remote control, etc.; and when the user can control the focus to be positioned on the automatic backlight adjustment function option and presses the "confirmation" key of the control device 100, the switch control can be controlled to move right to turn on the automatic backlight adjustment function, or the switch control can be controlled to move left to turn off the automatic backlight adjustment function.

Referring to FIG. 20, the backlight brightness control can be controlled to adjust the currently presented backlight brightness value according to the user's control. For example, the user can control the display apparatus 200 through the control device 100 such as a remote control, etc.; and after the user selects the backlight brightness control on the user interface, the user can press the left and right direction keys on the control device 100 to select the value of the target backlight brightness on the value bar.

As can be seen from the foregoing, in a case that the automatic backlight adjustment function of the display apparatus 200 is turned on, if the user manually adjusts the backlight brightness, the display apparatus 200 will still adjust the backlight brightness through the automatic backlight adjustment mode, and will not use the backlight brightness manually adjusted by the user. In the case that the automatic backlight adjustment function is not turned on, the user can adjust the value of the backlight brightness arbitrarily according to his/her needs. It can be seen that in the display apparatus 200, whether the user can manually adjust the backlight brightness depends on whether the automatic backlight adjustment function is turned on, and at the same time, whether the automatic backlight adjustment function and the manual backlight adjustment function can interact with each other also depends on whether the automatic backlight adjustment function is turned on.

Therefore, in the embodiments of the present disclosure, the display apparatus 200 needs to detect whether the automatic backlight adjustment function is turned on. If the automatic backlight adjustment function is turned on, the display apparatus 200 needs to automatically sense the brightness of the environment light in the environment where the display apparatus 200 is located by using devices such as a sensor, etc., and determine a corresponding target backlight brightness by using the brightness of the environment light; and then the display apparatus 200 adjusts current backlight brightness to the target backlight brightness.

In the display apparatus 200, a unified standard of the correspondence between the environment light brightness and the backlight brightness of the display apparatus 200 can be preset, and the display apparatus 200 can determine the corresponding backlight brightness of the display apparatus 200 by using the sensed environment light brightness according to the unified standard. The backlight brightness determined by the display apparatus 200 can be an actual brightness value, e.g., 100 cd/m2, 200 cd/m2, etc. Such brightness values cannot be directly presented on the display apparatus 200, and therefore, in the display apparatus 200, the actual brightness value of the backlight brightness determined according to the environment light brightness needs to be mapped to a value within 0-100, i.e., the value of the target backlight brightness, that is convenient for adjustment and display.

For example, if the environment light brightness sensed by the display apparatus 200 can be 500 cd/m2, then the backlight brightness determined in the display apparatus 200 according to the unified standard of the correspondence can be 600 cd/m2, and then 600 cd/m2 can be mapped to a value a, that is, the target backlight brightness can be the value a. The display apparatus 200 can automatically adjust the backlight brightness according to the value a of the backlight brightness.

In a case that the automatic backlight adjustment function is turned on, if the user thinks that the automatically adjusted backlight brightness does not meet the requirements, the user can manually adjust the backlight brightness control to select a target backlight brightness. In order to avoid mutual influence between the manual backlight adjustment function and the automatic backlight adjustment function, when the user manually adjusts the backlight brightness control, the display apparatus 200 needs to turn off the automatic backlight adjustment function. After the user adjusts the backlight brightness control to select the target backlight brightness, the display apparatus 200 adjusts the current backlight brightness to the target backlight brightness.

In the embodiments of the present disclosure, when the user adjusts the backlight brightness control, the user needs to input an adjustment command to the display apparatus 200. In order to distinguish this adjustment command from other adjustment commands, the adjustment command for adjusting the backlight brightness control can be referred to as the first adjustment command.

Before manually adjusting the backlight brightness, the user first can control the display apparatus 200 to present the backlight adjustment page, and then adjusts the backlight brightness control on the backlight adjustment page; and the user can know the value of the currently adjusted backlight brightness while adjusting the backlight brightness control. Therefore, the display apparatus 200 may first detect whether the automatic backlight adjustment function on the backlight adjustment page is turned on, and then receive the user's first adjustment command for manually adjusting the backlight brightness control based on that automatic backlight adjustment function is turned on.

Figure 21:
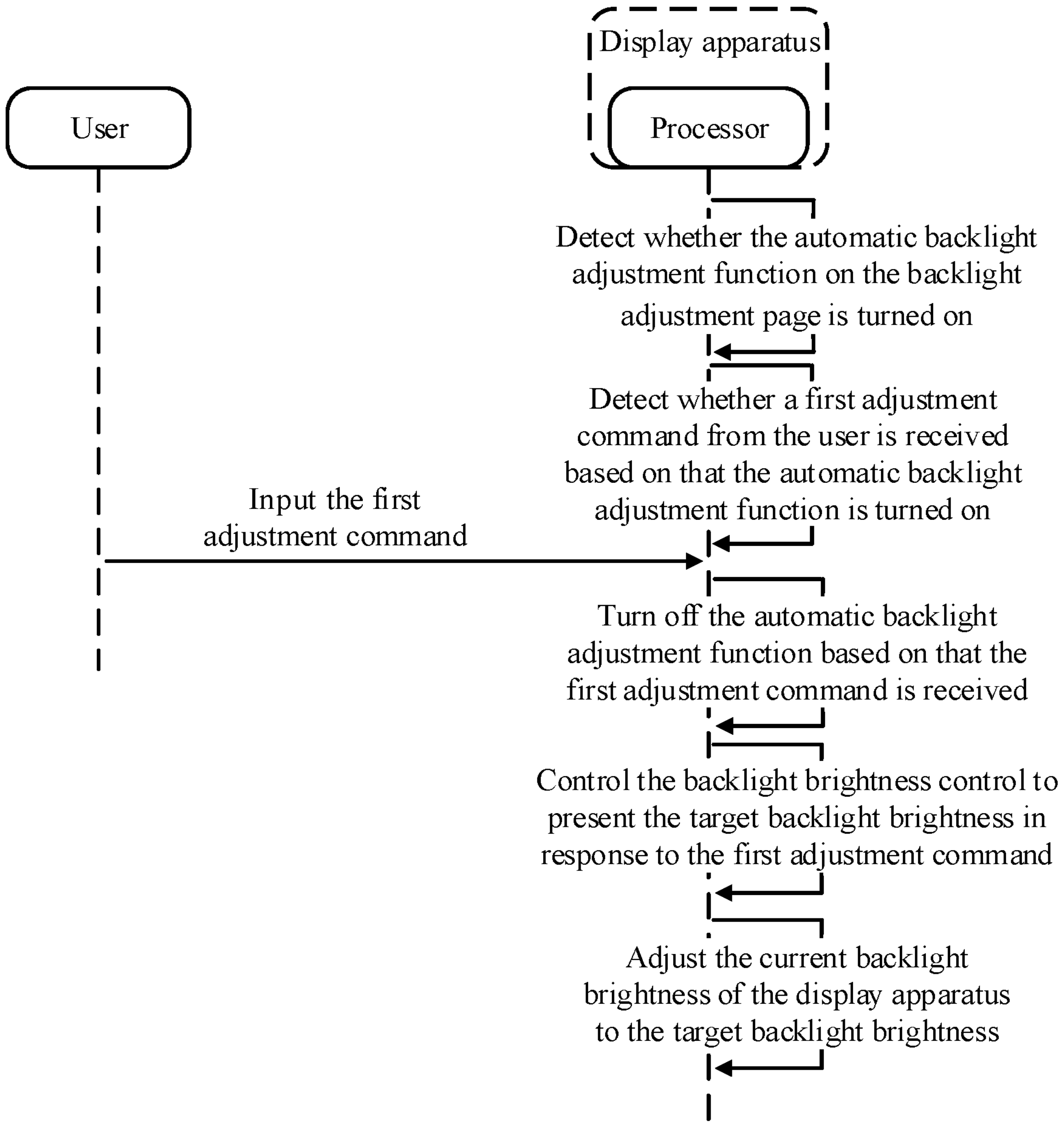
FIG. 21 is a schematic flowchart of a user manually adjusting backlight brightness in a display apparatus 200 according to some embodiments.

Referring to FIG. 21, FIG. 21 is a schematic flowchart of manually adjusting the backlight brightness in the display apparatus 200 according to some embodiments. The at least one processor 250 can be provided in the display apparatus 200, and the at least one processor 250 may control the display apparatus 200 to perform the above specific operations. In the process that the user manually adjusts the backlight brightness in the display apparatus 200, the at least one processor 250 may be configured to: detect whether the automatic backlight adjustment function on the backlight adjustment page is turned on; detect whether a first adjustment command from the user is received based on that the automatic backlight adjustment function is turned on; turn off the automatic backlight adjustment function based on that the first adjustment command is received, and at the same time, control the backlight brightness control to present the target backlight brightness in response to the first adjustment command; and finally, adjust the current backlight brightness of the display apparatus 200 to the target backlight brightness.

Figure 22:
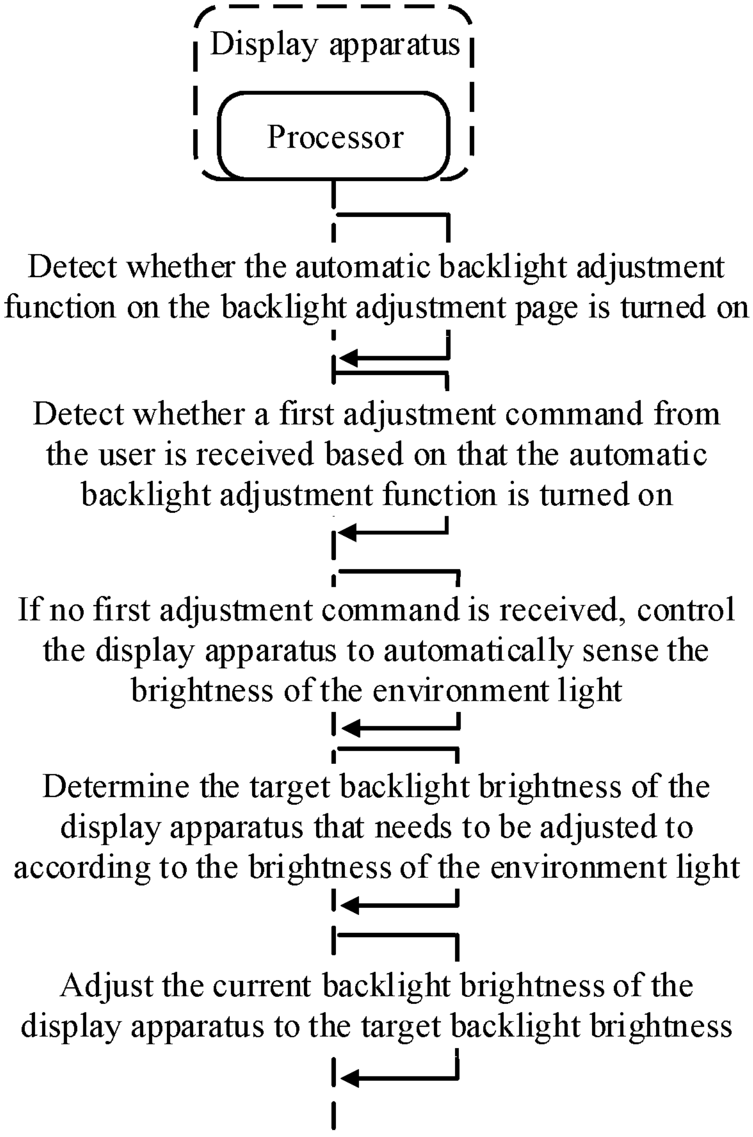
FIG. 22 is a schematic flowchart of automatically adjusting the backlight brightness in a display apparatus 200 according to some embodiments.

Referring to FIG. 22, FIG. 22 is a schematic flowchart of automatically adjusting the backlight brightness in the display apparatus 200 according to some embodiments. In the case that the automatic backlight adjustment function is turned on, the at least one processor 250 may also be configured to: if no first adjustment command is received, control the display apparatus 200 to automatically sense the brightness of the environment light; and then, determine the target backlight brightness of the display apparatus 200 that needs to be adjusted to according to the brightness of the environment light.

If the automatic backlight adjustment function is turned off, the display apparatus 200 does not need to automatically sense the brightness of the environment light, and the user directly adjusts the backlight brightness manually. In this case, the display apparatus 200 needs to receive a first adjustment command for adjusting the backlight brightness control from the user, and detect the target backlight brightness corresponding to the current position of the backlight brightness control where the backlight brightness control stops finally during adjustment of the backlight brightness control. At this time, the target backlight brightness may also be presented on the backlight brightness control. Finally, the display apparatus 200 adjusts the current backlight brightness to the target backlight brightness.

Figure 23:
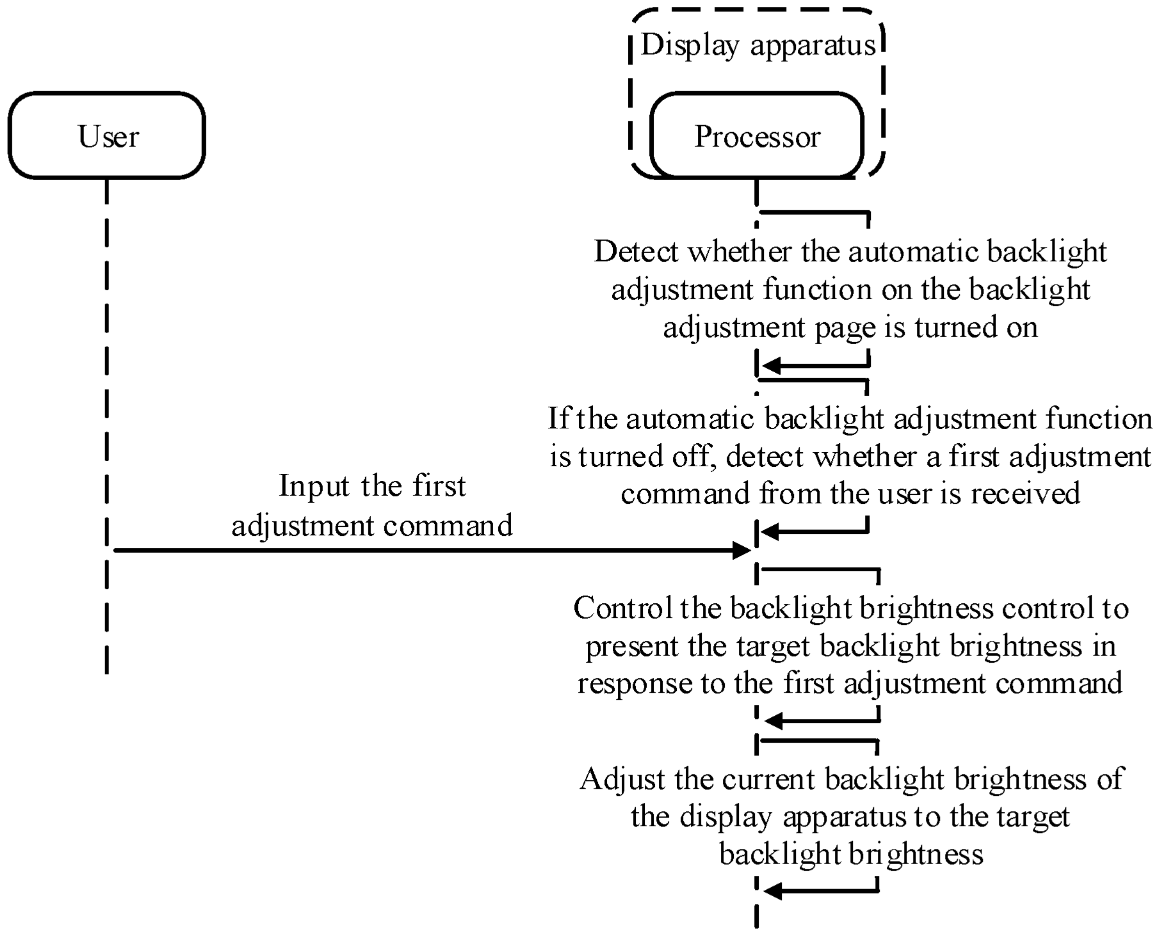
FIG. 23 is another schematic flowchart of manually adjusting backlight brightness in a display apparatus 200 according to some embodiments.

Referring to FIG. 23, FIG. 23 is another schematic flowchart of manually adjusting the backlight brightness in the display apparatus 200 according to some embodiments. In the process of manually adjusting the backlight brightness, the at least one processor 250 of the display apparatus 200 may also be configured to: if the automatic backlight adjustment function is turned off, detect whether a first adjustment command for adjusting the backlight brightness control on the backlight adjustment page is received; and, based on that the first adjustment command is received, control the backlight brightness control to present the target backlight brightness in response to the first adjustment command.

In the case that the automatic backlight adjustment function is turned off, if the user does not want to adjust the backlight brightness, the user can also actively turn on the automatic backlight adjustment function, that is, the user can select the option for the automatic backlight adjustment function on the backlight adjustment page and then input an on command. After the automatic backlight adjustment function is turned on, the display apparatus 200 may continue to sense the environment light to automatically adjust the backlight brightness, and at the same time, detect whether the user manually adjusts the backlight brightness again.

Figure 24:
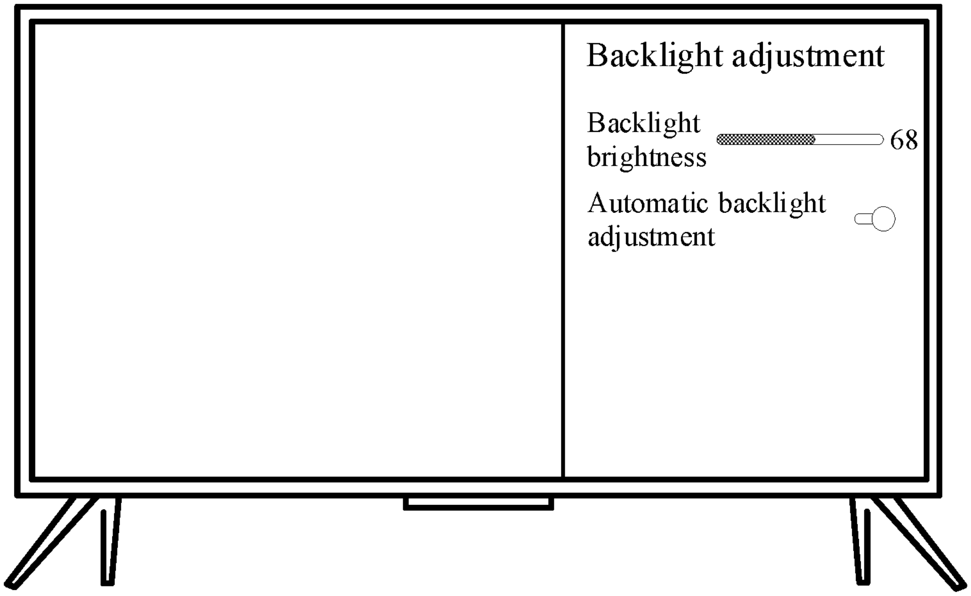
FIG. 24 is a schematic diagram of a backlight adjustment page after an automatic backlight adjustment function is turned on according to some embodiments.

For example, on the backlight adjustment page as shown in FIG. 20, the switch control of the automatic backlight adjustment function is currently in the off state, and the user can control the focus to be positioned on the option for the automatic backlight adjustment function and inputs an on command, e.g., pressing the "confirmation" key of the control device 100, etc., the switch control can be controlled to move to turn on the automatic backlight adjustment function. Referring to FIG. 24, FIG. 24 is a schematic diagram of a backlight adjustment page after the automatic backlight adjustment function is turned on according to some embodiments.

Figure 25:
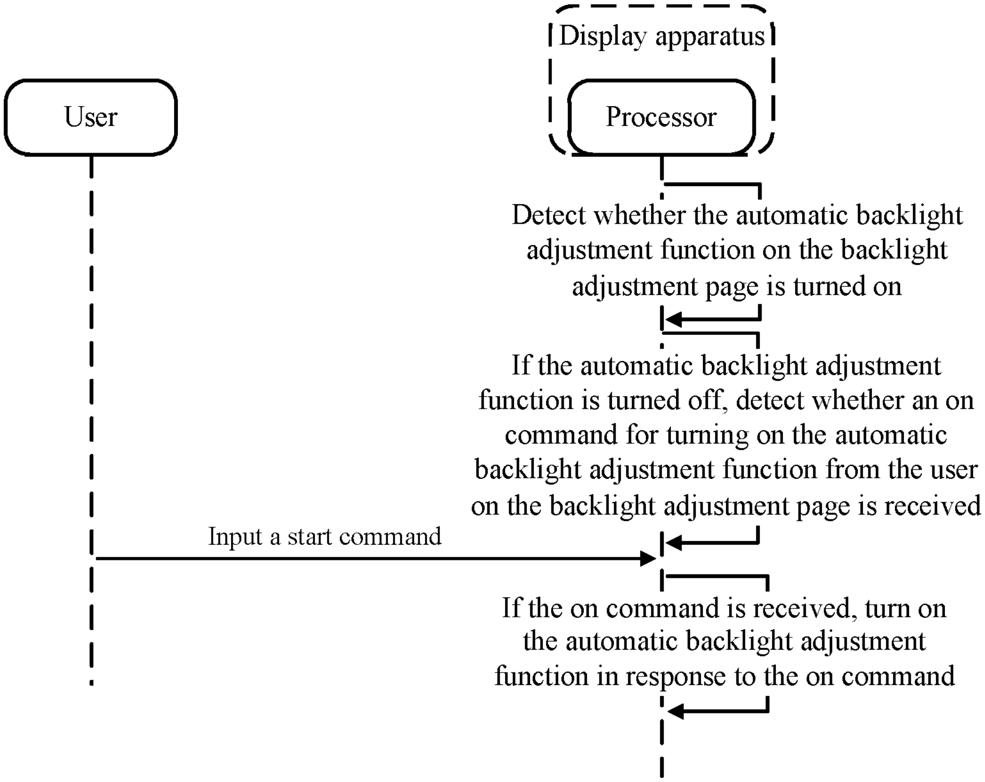
FIG. 25 is a schematic flowchart of turning on an automatic backlight adjustment function in a display apparatus 200 according to some embodiments.

Referring to FIG. 25, FIG. 25 is a schematic flowchart of turning on the automatic backlight adjustment function in the display apparatus 200 according to some embodiments. In the process of turning on the automatic backlight adjustment function, the at least one processor 250 of the display apparatus 200 may also be configured to: based on that the automatic backlight adjustment function is turned off, detect whether an on command for turning on the automatic backlight adjustment function on the backlight adjustment page is received; and, based on that the on command is received, turn on the automatic backlight adjustment function in response to the on command.

In some embodiments, in order to make the automatic backlight adjustment function better meet the user's requirements, the display apparatus 200 may also provide the user with a brightness offset control applied to the automatic backlight adjustment function, and the brightness offset control may be presented below the automatic backlight adjustment function. The user may adjust the specific brightness offset value by adjusting the brightness offset control. When the display apparatus 200 uses the automatic backlight adjustment function, the display apparatus 200 can determine the target backlight brightness by combining the sensed environment light brightness and the brightness offset value.

Figure 26:
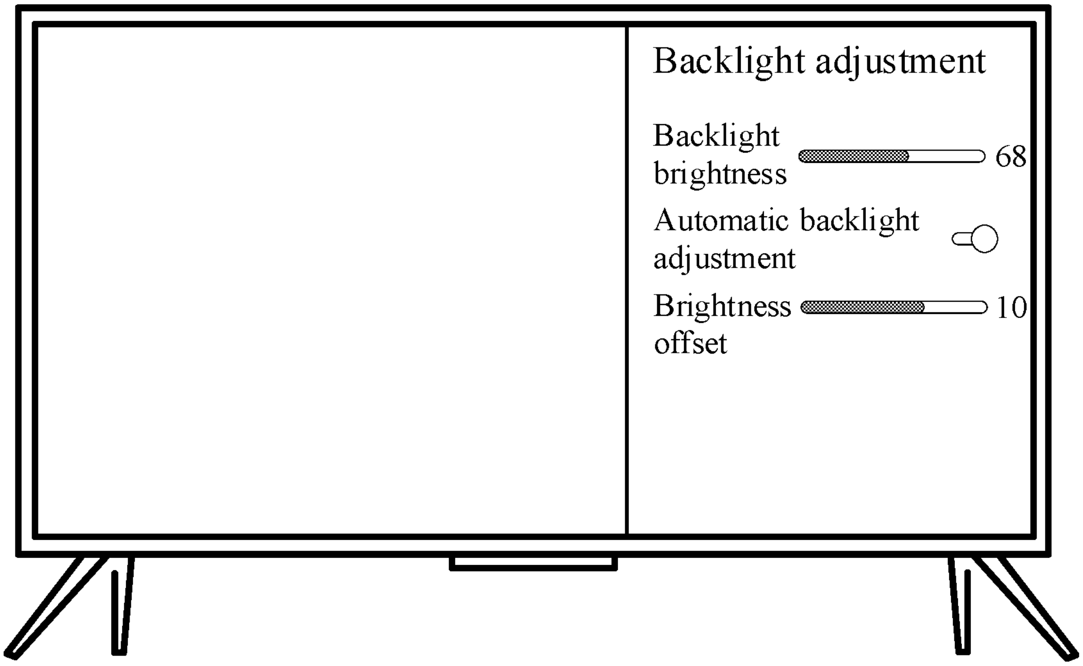
FIG. 26 is a schematic diagram of a backlight adjustment page with a brightness offset control according to some embodiments.

Referring to FIG. 26, FIG. 26 is a schematic diagram of a backlight adjustment page with a brightness offset control according to some embodiments. The user adjusts the brightness offset control to present the target offset value of 10. If the display apparatus 200 determines corresponding backlight brightness with a value of 50 based on the sensed environment light brightness, then the display apparatus 200 needs to add a value 10 to the backlight brightness value of 50, and finally determines target backlight brightness with a value of 60.

Figure 27:
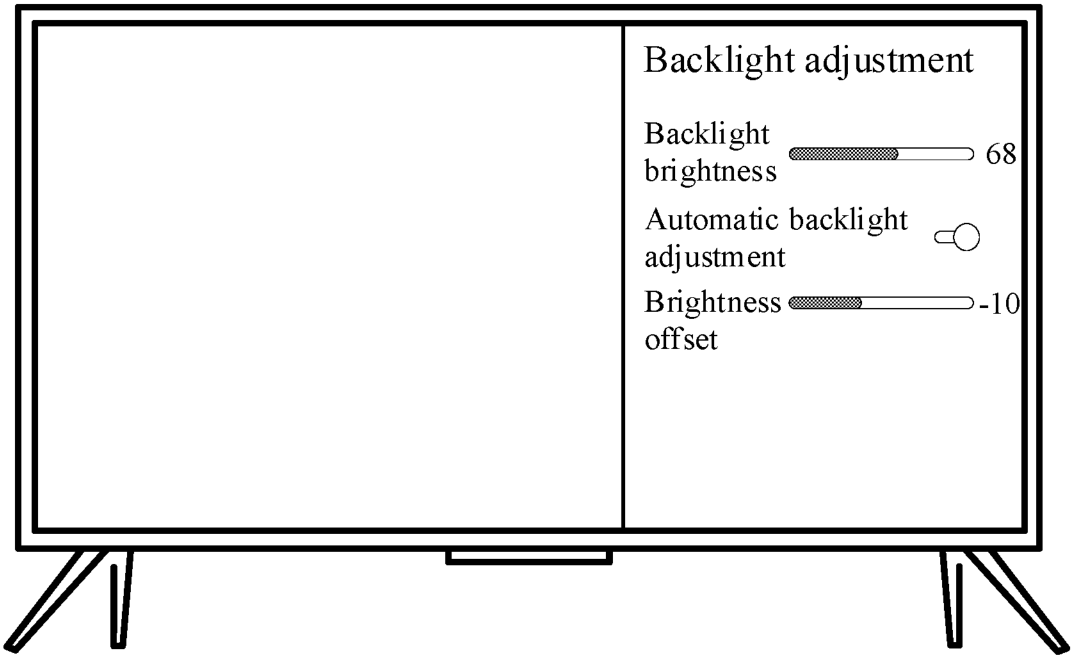
FIG. 27 is another schematic diagram of a backlight adjustment page with a brightness offset control according to some embodiments.

Alternatively, referring to FIG. 27, FIG. 27 is another schematic diagram of a backlight adjustment page with a brightness offset control according to some embodiments. The user adjusts the brightness offset control to present the target offset value of −10. If the display apparatus 200 determines corresponding backlight brightness with a value of 50 based on the sensed environment light brightness, then the display apparatus 200 needs to reduce a value of 10 from the backlight brightness value of 50, and finally determines the target backlight brightness with a value of 40.

Figure 28:
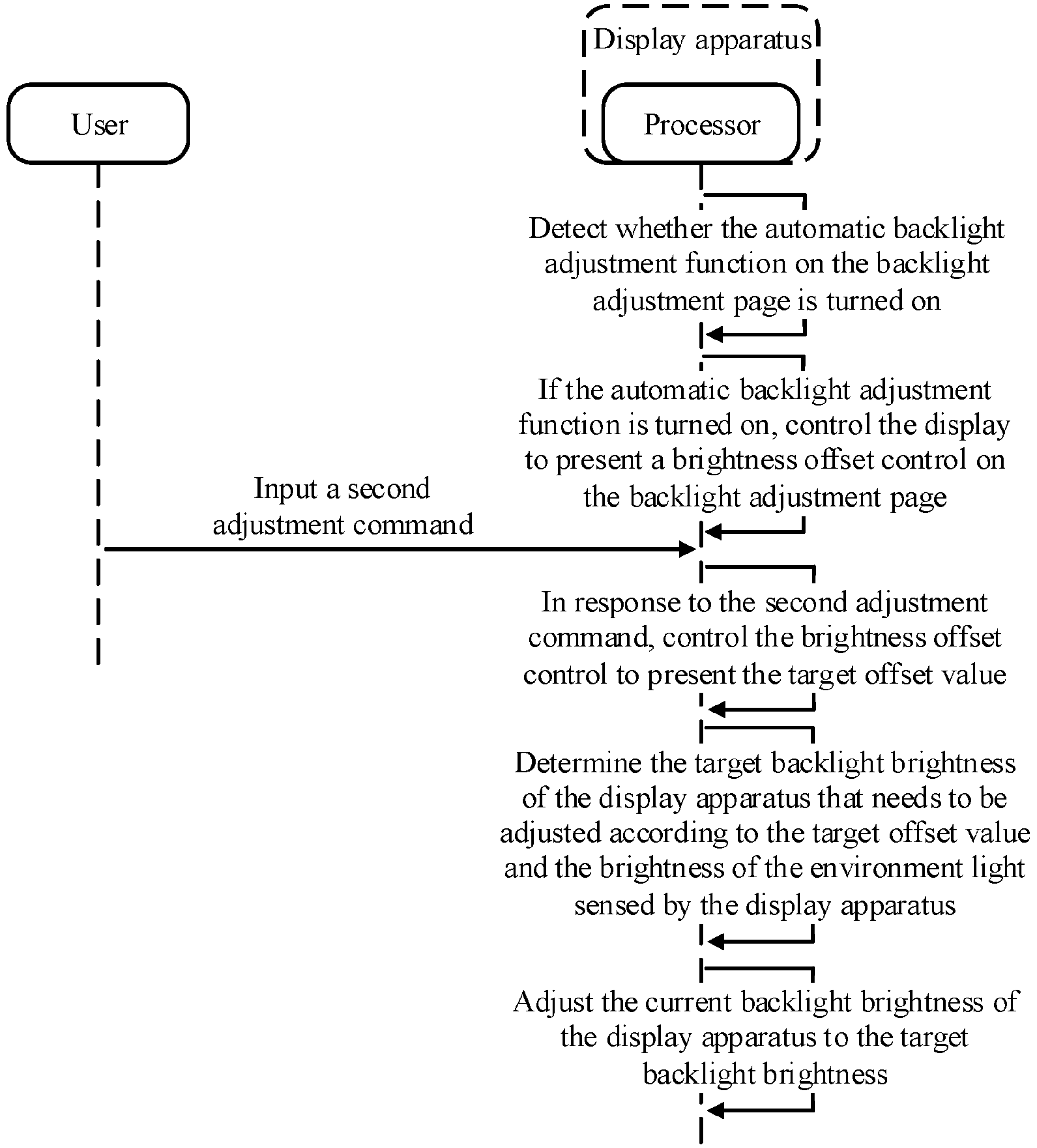
FIG. 28 is a schematic flowchart of implementing automatic backlight adjustment according to a brightness offset value in a display apparatus 200 according to some embodiments.

Referring to FIG. 28, FIG. 28 is a schematic flowchart of implementing automatic backlight adjustment according to the brightness offset value in the display apparatus 200 according to some embodiments. In the process of implementing automatic backlight adjustment according to the brightness offset value, the at least one processor 250 of the display apparatus 200 can be also configured to: in the case that the automatic backlight adjustment function is turned on, control the display 260 to present a brightness offset control on the backlight adjustment page; then, in response to a second adjustment command for adjusting the brightness offset control on the backlight adjustment page, control the brightness offset control to present the target offset value; and finally, determine the target backlight brightness of the display apparatus 200 that needs to be adjusted to according to the target offset value and the brightness of the environment light sensed by the display apparatus 200.

In some embodiments, the backlight adjustment page of the display apparatus 200 does not exist independently, but exists in the system setting page. Several function options are provided on the setting page. The user can control the display apparatus 200 to present the image setting page by selecting the image setting option on the setting page. The user can control the display apparatus 200 to present the backlight adjustment page by selecting the backlight adjustment option on the image setting page.

Figure 29:
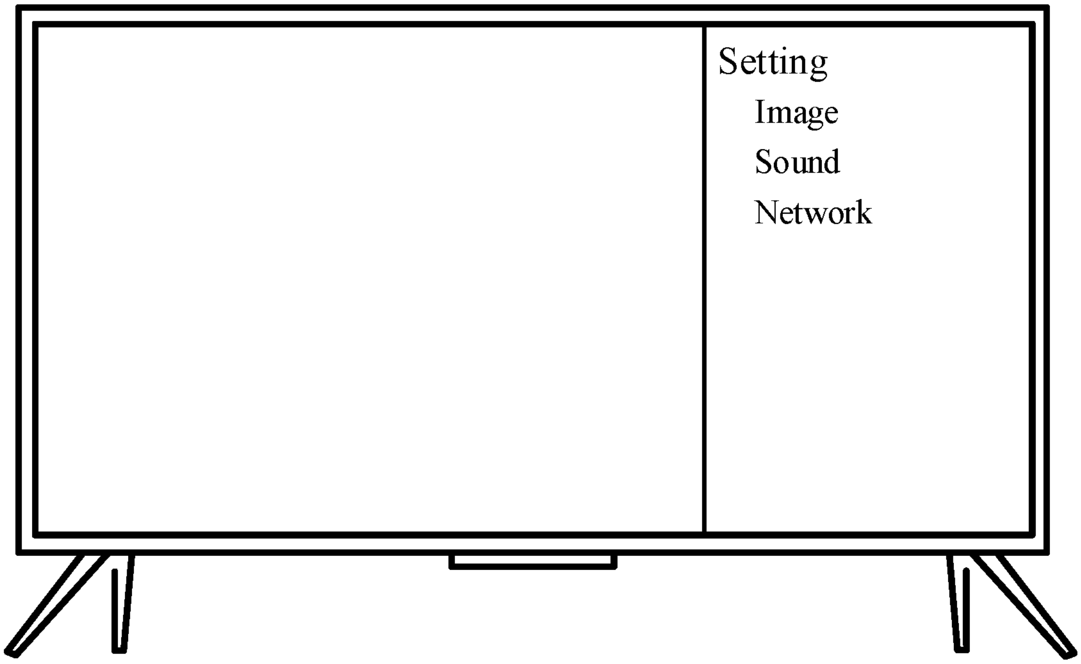
FIG. 29 is a schematic diagram of a setting page according to some embodiments.

Referring to FIG. 29, FIG. 29 is a schematic diagram of a setting page according to some embodiments. Several function options are provided on the setting page, such as an image setting option, a sound option, a network option, etc. Different function options also have different next-level setting pages.

Figure 30:
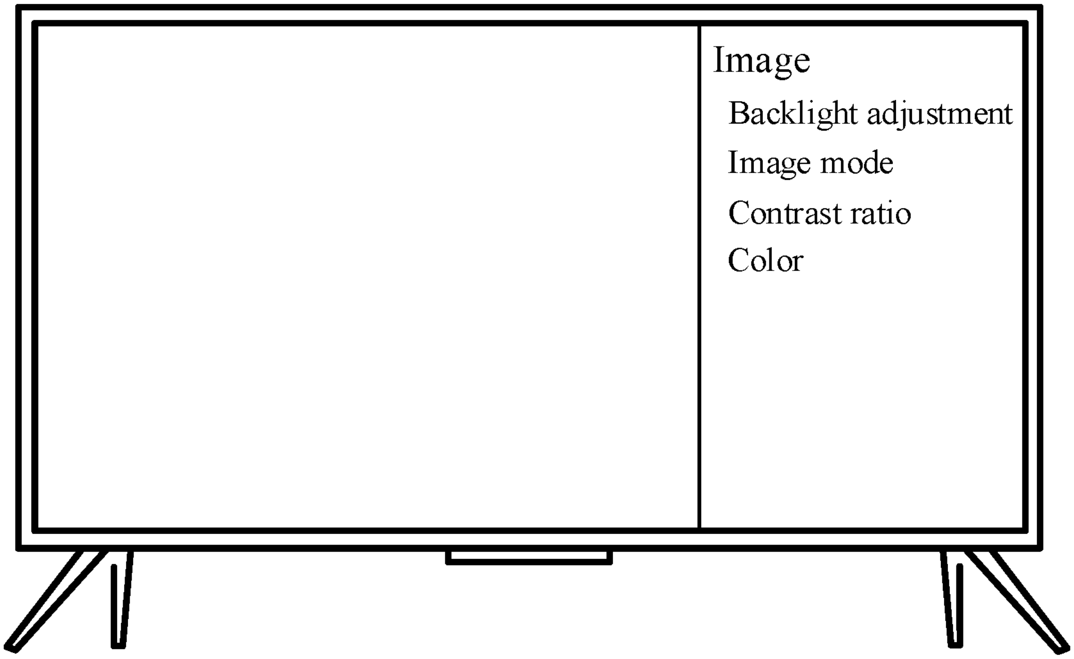
FIG. 30 is a schematic diagram of an image setting page according to some embodiments.

Referring to FIG. 30, FIG. 30 is a schematic diagram of an image setting page according to some embodiments. Several image function options, e.g., a backlight adjustment option, an image mode option, a color option, a contrast ratio option, etc., are provided on the image setting page. After the user selects the image setting option on the setting page as shown in FIG. 29, the display apparatus 200 may present the image setting page as shown in FIG. 30. After the user selects the backlight adjustment option on the image setting page as shown in FIG. 30, the display apparatus 200 may present the backlight adjustment page as shown in FIG. 20, FIG. 24, FIG. 26 or FIG. 27.

In the above process of presenting the backlight adjustment page, the at least one processor 250 of the display apparatus 200 may also be configured to: in response to a first selection command for selecting the image setting option on the setting page, control the display 260 to present the image setting page; and then, in response to a second selection command for selecting the backlight adjustment option on the image setting page, control the display 260 to present the backlight adjustment page.

Figure 31:
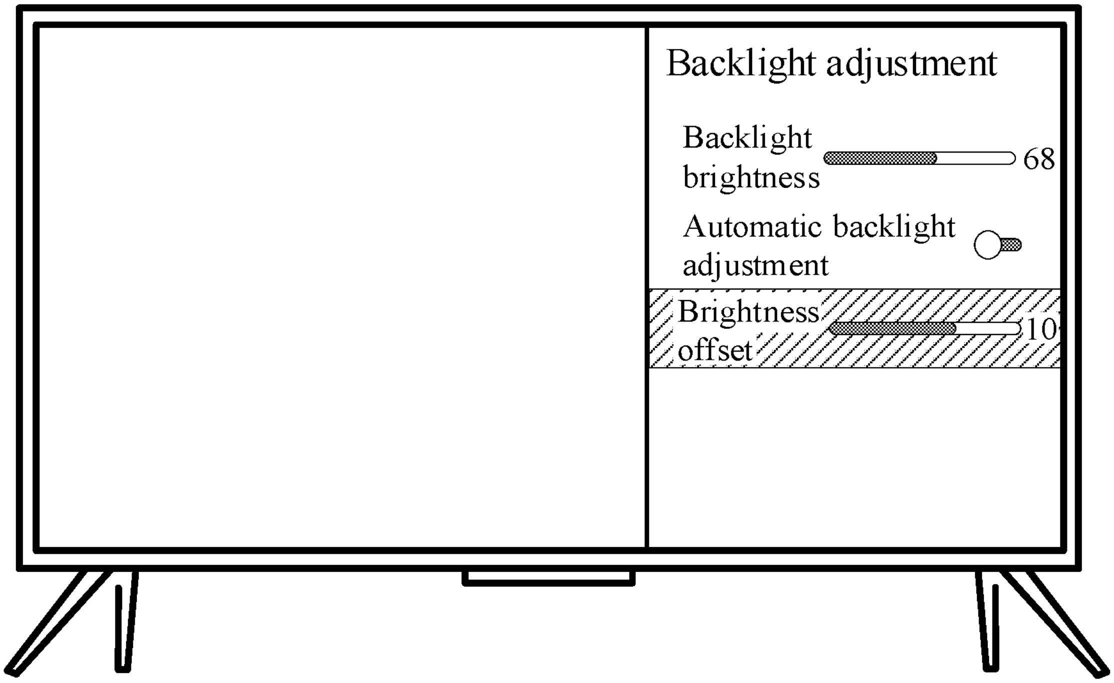
FIG. 31 is a schematic diagram of a backlight adjustment page when a brightness offset control is not adjustable according to some embodiments.

The brightness offset control in the foregoing embodiments can be controlled by the user to adjust the brightness offset value, but the brightness offset control can only be used when the automatic backlight adjustment function is turned on. In order to prevent the user from adjusting the brightness offset value in the case that the automatic backlight adjustment function is turned off, or prevent the user from mistakenly adjusting the brightness offset control as a backlight brightness, in some embodiments, the display apparatus 200 can set the brightness offset control to be a non-adjustable state in the case that the automatic backlight adjustment function is turned off. For example, FIG. 31 is a schematic diagram of the backlight adjustment page when the brightness offset control is not adjustable according to some embodiments. In FIG. 31, in the case that the automatic backlight function is turned off, the brightness offset control can be grayed out, indicating that it is not adjustable.

Figure 32:
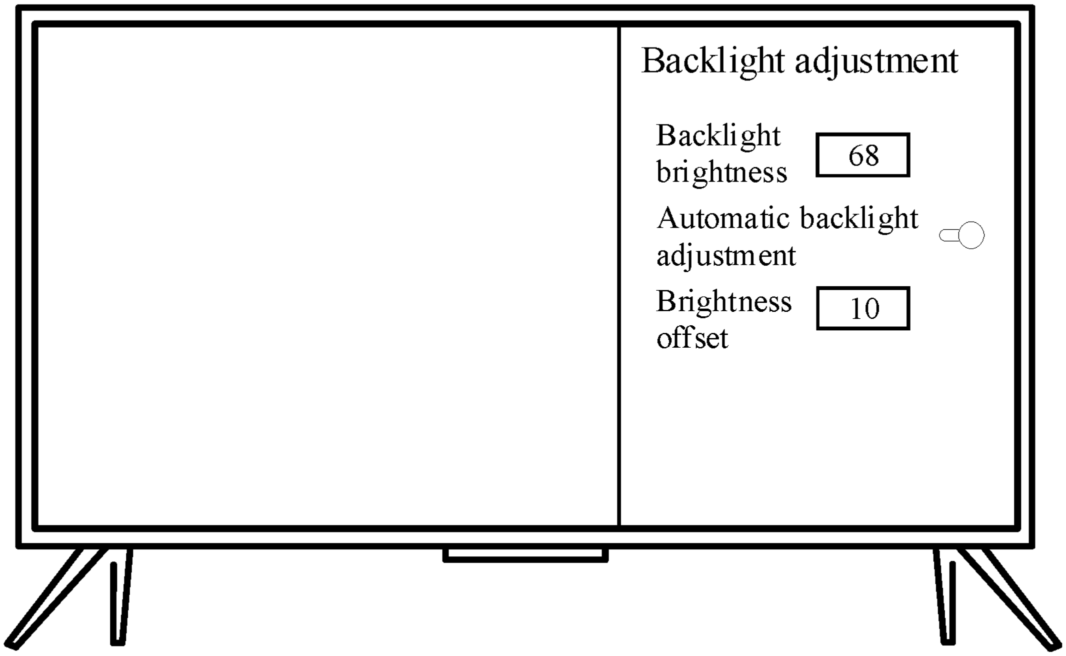
FIG. 32 is a schematic diagram of a backlight adjustment page with a brightness input box according to some embodiments.

In the foregoing embodiments, the adjustable brightness bar can be taken as an example to describe the backlight brightness control and the brightness offset control. In some embodiments, the backlight brightness control or the brightness offset control may also be an input box for filling in a brightness value, etc. Referring to FIG. 32, FIG. 32 is a schematic diagram of a backlight adjustment page with a brightness input box according to some embodiments. In FIG. 32, the backlight brightness control can be indicated in the form of an input box, and the user can input a specific target backlight brightness value in the input box; and the brightness offset control can also be indicated in the form of an input box, and the user can also input a specific target offset value in the input box.

It can be seen from the foregoing that the display apparatus 200 in the embodiments of the present disclosure can provide a user with a manual backlight adjustment function and an automatic backlight adjustment function. When the user needs to manually adjust the backlight brightness control and thus input an adjustment command to the display apparatus 200, the display apparatus 200 will turn off the automatic backlight adjustment function which has been turned on currently, so as to prevent the automatic backlight adjustment function from affecting the effect of the backlight brightness manually adjusted by the user. It can be seen that in the embodiments of the present disclosure, the manual backlight adjustment function and the automatic backlight adjustment function of the display apparatus 200 do not affect each other, ensuring usage experience of the user.

Considering the mutual influence between the manual backlight adjustment function and the automatic backlight adjustment function, the embodiments of the present disclosure further provide a backlight adjustment method, which can be applied to the display apparatus 200 in the foregoing embodiments. The method may specifically include: detecting whether an automatic backlight adjustment function on the backlight adjustment page is turned on; based on that the automatic backlight adjustment function is turned on, detecting whether a first adjustment command for adjusting the backlight brightness control on the backlight adjustment page is received; turning off the automatic backlight adjustment function based on that the first adjustment command is received, and at the same time, controlling the backlight brightness control to present the target backlight brightness in response to the first adjustment command; and finally, adjusting the current backlight brightness of the display apparatus 200 to the target backlight brightness.

In some embodiments, the method may further include: based on that the automatic backlight adjustment function is turned on and no first adjustment command is received, controlling the display apparatus 200 to automatically sense the brightness of the environment light; and determining the target backlight brightness of the display apparatus 200 that needs to be adjusted to according to the brightness of the environment light.

In some embodiments, the method may further include: based on that the automatic backlight adjustment function is turned off, detecting whether a first adjustment command for adjusting the backlight brightness control on the backlight adjustment page is received; and based on that the first adjustment command can be received, controlling the backlight brightness control to present the target backlight brightness in response to the first adjustment command.

In some embodiments, the method may further include: based on that the automatic backlight adjustment function is turned off, detecting whether an on command for turning on the automatic backlight adjustment function on the backlight adjustment page is received; and based on that the on command is received, turning on the automatic backlight adjustment function in response to the on command.

In some embodiments, the method may further include: in response to a first selection command for selecting an image setting option on the setting page, controlling the display 260 to present the image setting page; and in response to a second selection command for selecting the backlight adjustment option on the image setting page, controlling the display 260 to present the backlight adjustment page.

In some embodiments, the method may further include: based on that the automatic backlight adjustment function is turned on, controlling the display 260 to present a brightness offset control on the backlight adjustment page; in response to a second adjustment command for adjusting the brightness offset control on the backlight adjustment page, controlling the brightness offset control to present the target offset value; and according to the target offset value and the brightness of the environment light sensed by the display apparatus 200, determining the target backlight brightness of the display apparatus 200 that needs to be adjusted to.

For the convenience of explanation, the above embodiments are described in combination with specific embodiments. However, the above exemplary discussion is not intended to be exhaustive or to limit the embodiments to the specific forms disclosed above. Based on the above teachings, various modifications and equivalents can be obtained. The selection and description of the above embodiments are to better explain the principles and practical applications, so as to enable those skilled in the art to better use the embodiments and various variant embodiments suitable for specific use considerations.

What is claimed:

1. A display apparatus, comprising:

a display, configured to present an image from a broadcast system or a network and/or a user interface; and at least one processor in connection with the display and configured to execute instructions to cause the display apparatus to:

detect whether an automatic backlight adjustment function on a backlight adjustment page of the display apparatus is turned on; wherein the backlight adjustment page comprises an option for indicating the automatic backlight adjustment function and a backlight brightness control for adjusting a backlight brightness value according to an adjustment command input from a user;

based on that the automatic backlight adjustment function is turned on, control the display apparatus to automatically sense brightness of environment light, and present a brightness offset control on the backlight adjustment page; wherein the brightness offset control is configured to adjust a brightness offset value according to a command input from the user;

detect whether a first adjustment command for adjusting the backlight brightness control from the user on the backlight adjustment page is received;

based on that no first adjustment command is received, control the brightness offset control to present a target offset value in response to a second adjustment command for adjusting the brightness offset control from the user on the backlight adjustment page; and determine a target backlight brightness of the display apparatus that needs to be adjusted to according to the target offset value and the brightness of environment light sensed by the display apparatus.

2. The display apparatus according to claim 1, wherein the at least one processor is further configured to execute the instructions to cause the display apparatus to:

based on that the first adjustment command is received, turn off the automatic backlight adjustment function, set the brightness offset control to be not adjustable, and control the backlight brightness control to present a target backlight brightness; and adjust a backlight brightness of the display apparatus to the target backlight brightness.

3. The display apparatus according to claim 1, wherein the at least one processor is further configured to execute the instructions to cause the display apparatus to:

based on that the automatic backlight adjustment function is turned on and no first adjustment command is received, control the display apparatus to automatically sense the brightness of environment light; and determine a target backlight brightness of the display apparatus that needs to be adjusted to according to the brightness of environment light.

4. The display apparatus according to claim 1, wherein the at least one processor is further configured to execute the instructions to cause the display apparatus to:

based on that the automatic backlight adjustment function is turned off, detect whether the first adjustment command for adjusting the backlight brightness control from the user on the backlight adjustment page is received; and based on that the first adjustment command is received, control the backlight brightness control to present a target backlight brightness.

5. The display apparatus according to claim 1, wherein the at least one processor is further configured to execute the instructions to cause the display apparatus to:

based on that the automatic backlight adjustment function is turned off, detect whether an on command for turning on the automatic backlight adjustment function from the user on the backlight adjustment page is received; and based on that the on command is received, turn on the automatic backlight adjustment function.

6. The display apparatus according to claim 1, wherein the at least one processor is further configured to execute the instructions to cause the display apparatus to:

in response to a first selection command for selecting an image setting option on a setting page, control the display to present an image setting page; and in response to a second selection command for selecting a backlight adjustment option on the image setting page, control the display to present the backlight adjustment page.

7. The display apparatus according to claim 1, wherein a value of the target backlight brightness is a sum of the target offset value and a backlight brightness value corresponding to the brightness of environment light sensed by the display apparatus, and the target offset value is a negative value or a positive value.

8. A display method for a display apparatus, comprising:

detecting whether an automatic backlight adjustment function on a backlight adjustment page of the display apparatus is turned on; wherein the backlight adjustment page comprises an option for indicating the automatic backlight adjustment function and a backlight brightness control for adjusting a backlight brightness value according to an adjustment command input from a user;

based on that the automatic backlight adjustment function is turned on, controlling the display apparatus to automatically sense brightness of environment light, and present a brightness offset control on the backlight adjustment page; wherein the brightness offset control is configured to adjust a brightness offset value according to a command input from the user;

detecting whether a first adjustment command for adjusting the backlight brightness control from the user on the backlight adjustment page is received;

based on that no first adjustment command is received, controlling the brightness offset control to present a target offset value in response to a second adjustment command for adjusting the brightness offset control from the user on the backlight adjustment page; and determining a target backlight brightness of the display apparatus that needs to be adjusted to according to the target offset value and the brightness of environment light sensed by the display apparatus.

9. The display method according to claim 8, further comprising:

based on that the first adjustment command is received, turning off the automatic backlight adjustment function, setting the brightness offset control to be not adjustable, and controlling the backlight brightness control to present a target backlight brightness; and adjusting a backlight brightness of the display apparatus to the target backlight brightness.

10. The display method according to claim 8, further comprising:

based on that the automatic backlight adjustment function is turned on and no first adjustment command is received, controlling the display apparatus to automatically sense the brightness of environment light; and determining a target backlight brightness of the display apparatus that needs to be adjusted to according to the brightness of environment light.

11. The display method according to claim 8, further comprising:

based on that the automatic backlight adjustment function is turned off, detecting whether the first adjustment command for adjusting the backlight brightness control from the user on the backlight adjustment page is received; and based on that the first adjustment command is received, controlling the backlight brightness control to present a target backlight brightness.

12. The display method according to claim 8, further comprising:

based on that the automatic backlight adjustment function is turned off, detecting whether an on command for turning on the automatic backlight adjustment function from the user on the backlight adjustment page is received; and based on that the on command is received, turning on the automatic backlight adjustment function.

13. The display method according to claim 8, further comprising:

in response to a first selection command for selecting an image setting option on a setting page, controlling a display of the display apparatus to present an image setting page; and in response to a second selection command for selecting a backlight adjustment option on the image setting page, controlling the display to present the backlight adjustment page.

14. The display method according to claim 8, wherein a value of the target backlight brightness is a sum of the target offset value and a backlight brightness value corresponding to the brightness of environment light sensed by the display apparatus, and the target offset value is a negative value or a positive value.

* * * * *